(12) United States Patent
Tanaka et al.

(10) Patent No.: US 12,208,625 B2
(45) Date of Patent: Jan. 28, 2025

(54) IMAGE PROCESSING DEVICE, IMAGE PROCESSING METHOD, AND IMAGE PROCESSING PROGRAM

(71) Applicant: SEIKO EPSON CORPORATION, Tokyo (JP)

(72) Inventors: Katsuyuki Tanaka, Nagano (JP); Takuya Ono, Nagano (JP); Yuko Yamamoto, Nagano (JP); Takumi Shimomukai, Nagano (JP); Shotaro Matsuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 18/053,391

(22) Filed: Nov. 8, 2022

(65) Prior Publication Data

US 2023/0144881 A1 May 11, 2023

(30) Foreign Application Priority Data

Nov. 10, 2021 (JP) .................................. 2021-183113

(51) Int. Cl.
| | | |
|---|---|---|
| *B41J 2/21* | (2006.01) | |
| *B41J 2/175* | (2006.01) | |
| *H04N 1/00* | (2006.01) | |
| *H04N 1/60* | (2006.01) | |

(52) U.S. Cl.
CPC ......... *B41J 2/2103* (2013.01); *B41J 2/17566* (2013.01); *H04N 1/00482* (2013.01); *H04N 1/6094* (2013.01)

(58) Field of Classification Search
CPC . B41J 2/2103; B41J 2/17566; H04N 1/00482; H04N 1/6094; H04N 1/605; H04N 1/6097
See application file for complete search history.

(56) References Cited

U.S. PATENT DOCUMENTS

| | | |
|---|---|---|
| 2008/0246982 A1 | 10/2008 | Kaneko et al. |
| 2011/0249280 A1 | 10/2011 | Ito |
| 2015/0213343 A1 | 7/2015 | Ono |
| 2016/0132757 A1 | 5/2016 | Yamagata |

FOREIGN PATENT DOCUMENTS

| | | |
|---|---|---|
| JP | 2001-105636 A | 4/2001 |
| JP | 2008-230047 A | 10/2008 |
| JP | 2008-252318 A | 10/2008 |
| JP | 2009-153063 A | 7/2009 |
| JP | 2009-220356 A | 10/2009 |

(Continued)

*Primary Examiner* — Lisa Solomon
(74) *Attorney, Agent, or Firm* — Global IP Counselors, LLP

(57) ABSTRACT

Provided is an image processing device coupled to a printing device that performs printing on a medium by ejecting ink having a plurality of colors, and configured to convert image data into ink amount data. The image processing device includes: an input unit configured to input a search condition; an acquisition unit configured to acquire a plurality of search values based on the search condition input by the input unit; a table storage unit storing a plurality of image conversion tables for converting the image data into the ink amount data; and a search unit configured to search the plurality of image conversion tables for a target image conversion table based on the plurality of search values acquired by the acquisition unit.

8 Claims, 18 Drawing Sheets

(56) References Cited

FOREIGN PATENT DOCUMENTS

| | | |
|---|---|---|
| JP | 2011-223392 A | 11/2011 |
| JP | 2013-069202 A | 4/2013 |
| JP | 2015-142312 A | 8/2015 |
| JP | 2016-092650 A | 5/2016 |
| JP | 2017-183885 A | 10/2017 |

FIG. 3

| INPUT CHANNEL VALUE | | | | INK AMOUNT | | | | | | | | MAXIMUM PRIMARY COLOR AMOUNT | MAXIMUM SECONDARY COLOR AMOUNT | MAXIMUM TOTAL INK AMOUNT |
|---|---|---|---|---|---|---|---|---|---|---|---|---|---|---|
| C | M | Y | K | C | Lc | M | Lm | Y | K | Or | Vi | | | |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 18.8 | 0.0 | 0.0 | 0.0 | 0.0 | 0.0 | 3.6 | 0.0 | 0.0 | 3.6 | 3.6 | 3.6 |
| 0.0 | 0.0 | 0.0 | 100.0 | 0.0 | 0.0 | 0.0 | 0.0 | 0.0 | 100.0 | 0.0 | 0.0 | 100.0 | 100.0 | 100.0 |
| 0.0 | 0.0 | 100.0 | 0.0 | 0.0 | 0.0 | 0.0 | 0.0 | 100.0 | 0.0 | 0.0 | 0.0 | 100.0 | 100.0 | 100.0 |
| 0.0 | 100.0 | 0.0 | 0.0 | 0.0 | 0.0 | 100.0 | 0.0 | 0.0 | 0.0 | 0.0 | 0.0 | 100.0 | 100.0 | 100.0 |
| 50.0 | 0.0 | 50.0 | 0.0 | 20.0 | 20.0 | 10.0 | 0.0 | 100.0 | 0.0 | 0.0 | 20.0 | 100.0 | 120.0 | 160.0 |
| 100.0 | 0.0 | 0.0 | 0.0 | 10.0 | 0.0 | 0.0 | 0.0 | 0.0 | 0.0 | 0.0 | 100.0 | 100.0 | 110.0 | 120.0 |
| 100.0 | 100.0 | 0.0 | 0.0 | 60.0 | 0.0 | 40.0 | 0.0 | 40.0 | 0.0 | 60.0 | 0.0 | 60.0 | 120.0 | 200.0 |
| 100.0 | 100.0 | 100.0 | 100.0 | 20.0 | 0.0 | 20.0 | 0.0 | 20.0 | 100.0 | 0.0 | 20.0 | 100.0 | 120.0 | 180.0 |

| PRIORITY ORDER | TYPE OF SEARCH PARAMETER | SEARCH PARAMETER |
|---|---|---|
| 1 | MEDIUM NAME | MEDIUM C |
| 2 | RESOLUTION | 1200X1200 |

| TYPE OF PARAMETER | PARAMETER |
|---|---|
| MEDIUM NAME | MEDIUM A |
| RESOLUTION | 1200X1200 |

FIG. 7B

| TYPE OF PARAMETER | PARAMETER |
|---|---|
| MEDIUM NAME | MEDIUM B |
| RESOLUTION | 1200X1200 |

FIG. 7C

| TYPE OF PARAMETER | PARAMETER |
|---|---|
| MEDIUM NAME | MEDIUM C |
| RESOLUTION | 1200X1200 |

| PRIORITY ORDER | TYPE OF SEARCH PARAMETER | SEARCH PARAMETER |
|---|---|---|
| 1 | INK COMPOSITION | CLcMLmYKOrVi |
| 2 | TOTAL INK USE AMOUNT UPPER LIMIT VALUE | 200% |
| 3 | PRIMARY COLOR INK USE AMOUNT UPPER LIMIT VALUE | 100% |
| 4 | SECONDARY COLOR INK USE AMOUNT UPPER LIMIT VALUE | 120% |

FIG. 10A

| TYPE OF PARAMETER | PARAMETER |
|---|---|
| INK COMPOSITION | CLcMLmYKOrVi |
| TOTAL INK USE AMOUNT UPPER LIMIT VALUE | 200% |
| PRIMARY COLOR INK USE AMOUNT UPPER LIMIT VALUE | 100% |
| SECONDARY COLOR INK USE AMOUNT UPPER LIMIT VALUE | 120% |

FIG. 10B

| TYPE OF PARAMETER | PARAMETER |
|---|---|
| INK COMPOSITION | CLcMLmYKOrVi |
| TOTAL INK USE AMOUNT UPPER LIMIT VALUE | 200% |
| PRIMARY COLOR INK USE AMOUNT UPPER LIMIT VALUE | 90% |
| SECONDARY COLOR INK USE AMOUNT UPPER LIMIT VALUE | 120% |

FIG. 10C

| TYPE OF PARAMETER | PARAMETER |
|---|---|
| INK COMPOSITION | CLcMLmYKOrVi |
| TOTAL INK USE AMOUNT UPPER LIMIT VALUE | 150% |
| PRIMARY COLOR INK USE AMOUNT UPPER LIMIT VALUE | 90% |
| SECONDARY COLOR INK USE AMOUNT UPPER LIMIT VALUE | 120% |

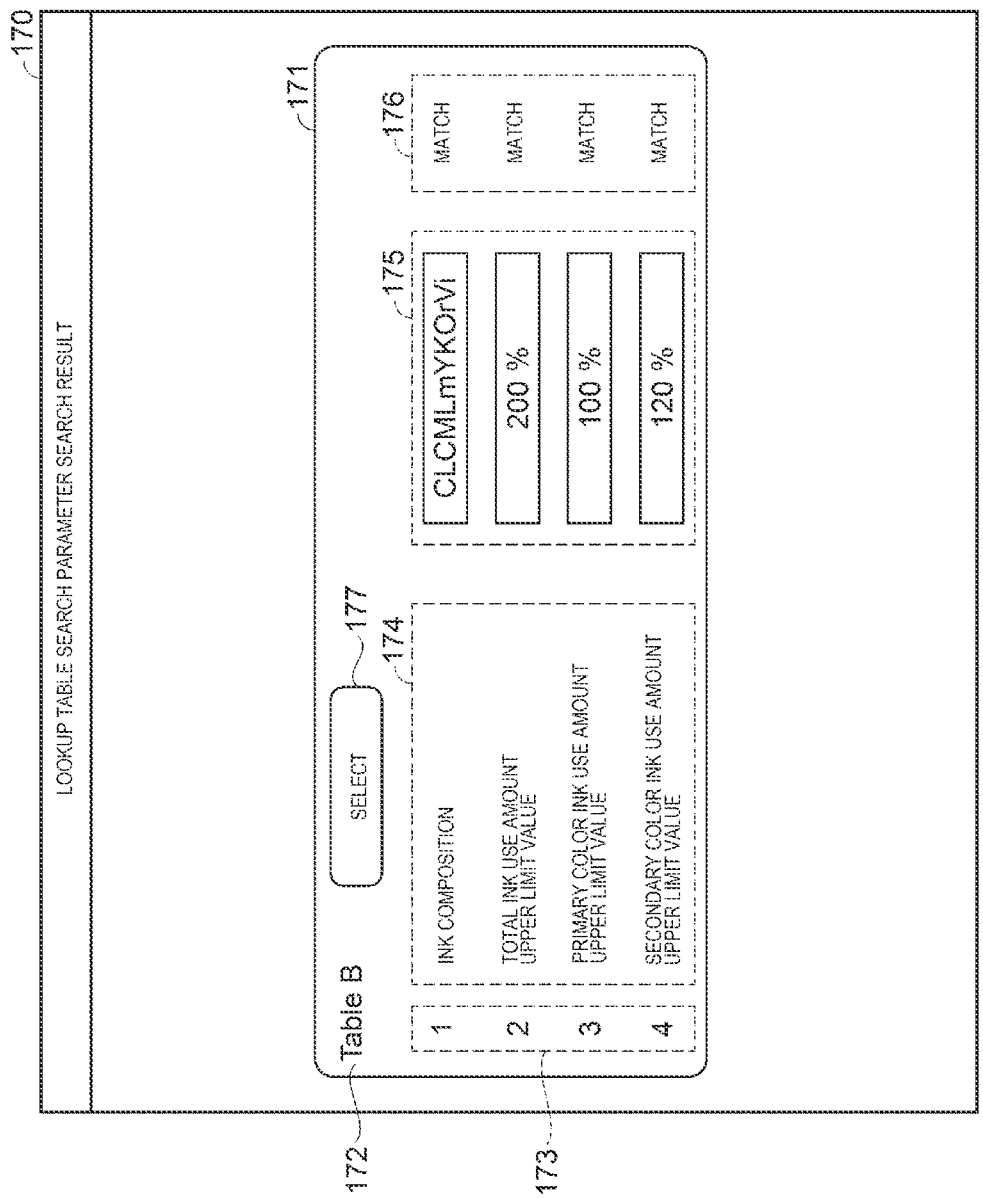

FIG. 13A

| TYPE OF PARAMETER | PARAMETER |
|---|---|
| INK COMPOSITION | CLcMLmYKOrVi |
| TOTAL INK USE AMOUNT UPPER LIMIT VALUE | 190% |
| PRIMARY COLOR INK USE AMOUNT UPPER LIMIT VALUE | 100% |
| SECONDARY COLOR INK USE AMOUNT UPPER LIMIT VALUE | 110% |

FIG. 13B

| TYPE OF PARAMETER | PARAMETER |
|---|---|
| INK COMPOSITION | CLcMLmYKOrVi |
| TOTAL INK USE AMOUNT UPPER LIMIT VALUE | 200% |
| PRIMARY COLOR INK USE AMOUNT UPPER LIMIT VALUE | 90% |
| SECONDARY COLOR INK USE AMOUNT UPPER LIMIT VALUE | 110% |

FIG. 13C

| TYPE OF PARAMETER | PARAMETER |
|---|---|
| INK COMPOSITION | CLcMLmYKOrVi |
| TOTAL INK USE AMOUNT UPPER LIMIT VALUE | 150% |
| PRIMARY COLOR INK USE AMOUNT UPPER LIMIT VALUE | 90% |
| SECONDARY COLOR INK USE AMOUNT UPPER LIMIT VALUE | 100% |

FIG. 14

LOOKUP TABLE SEARCH PARAMETER SEARCH RESULT

Table C

| | | CLCMLmYKOrVi | MATCH |
|---|---|---|---|
| 1 | INK COMPOSITION | | 0 |
| 2 | TOTAL INK USE AMOUNT UPPER LIMIT VALUE | 200 % | 10 |
| 3 | PRIMARY COLOR INK USE AMOUNT UPPER LIMIT VALUE | 90 % | |
| 4 | SECONDARY COLOR INK USE AMOUNT UPPER LIMIT VALUE | 110 % | 10 |

SELECT

Table A

| | | CLCMLmYKOrVi | MATCH |
|---|---|---|---|
| 1 | INK COMPOSITION | | 10 |
| 2 | TOTAL INK USE AMOUNT UPPER LIMIT VALUE | 190 % | 0 |
| 3 | PRIMARY COLOR INK USE AMOUNT UPPER LIMIT VALUE | 100 % | |
| 4 | SECONDARY COLOR INK USE AMOUNT UPPER LIMIT VALUE | 110 % | 10 |

SELECT

| PRIORITY ORDER | TYPE OF SEARCH PARAMETER | SEARCH PARAMETER |
|---|---|---|
| 1 | INK COMPOSITION | CLcMLmYKOrVi |
| 2 | TOTAL INK USE AMOUNT UPPER LIMIT VALUE | 200% |
| 2 | PRIMARY COLOR INK USE AMOUNT UPPER LIMIT VALUE | 100% |
| 2 | SECONDARY COLOR INK USE AMOUNT UPPER LIMIT VALUE | 120% |
| 2 | DEGREE OF CLOSENESS TO COLOR CHANGE TABLE | SEARCH COLOR CHANGE TABLE |

FIG. 17A

| TYPE OF PARAMETER | PARAMETER |
|---|---|
| INK COMPOSITION | CLcMLmYKOrVi |
| TOTAL INK USE AMOUNT UPPER LIMIT VALUE | 190% |
| PRIMARY COLOR INK USE AMOUNT UPPER LIMIT VALUE | 100% |
| SECONDARY COLOR INK USE AMOUNT UPPER LIMIT VALUE | 110% |
| COLOR CHANGE TABLE | COLOR CHANGE TABLE A |

FIG. 17B

| TYPE OF PARAMETER | PARAMETER |
|---|---|
| INK COMPOSITION | CLcMLmYKOrVi |
| TOTAL INK USE AMOUNT UPPER LIMIT VALUE | 200% |
| PRIMARY COLOR INK USE AMOUNT UPPER LIMIT VALUE | 90% |
| SECONDARY COLOR INK USE AMOUNT UPPER LIMIT VALUE | 110% |
| COLOR CHANGE TABLE | COLOR CHANGE TABLE B |

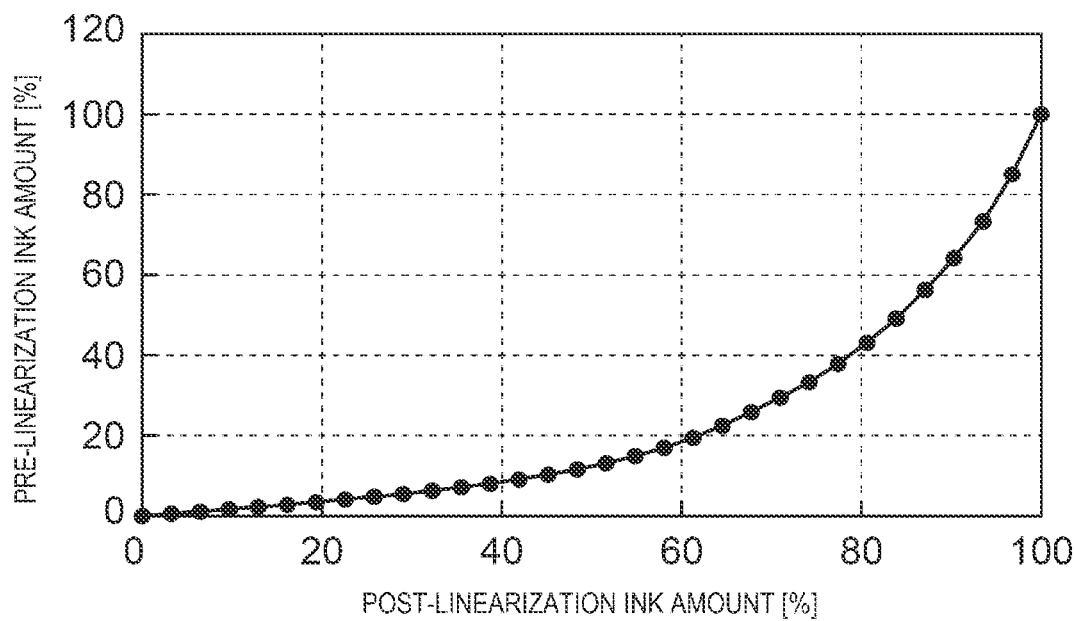

FIG. 20

LOOKUP TABLE SEARCH PARAMETER SEARCH RESULT

Table D

| | |
|---|---|
| 1 | INK COMPOSITION |
| 2 | TOTAL INK USE AMOUNT UPPER LIMIT VALUE |
| 2 | PRIMARY COLOR INK USE AMOUNT UPPER LIMIT VALUE |
| 2 | SECONDARY COLOR INK USE AMOUNT UPPER LIMIT VALUE |
| 2 | DEGREE OF CLOSENESS TO COLOR CHANGE TABLE |

| CLCMLmYKOrVi | MATCH |
|---|---|
| 190 % | 10 |
| 100 % | 0 |
| 110 % | 10 |
| 11.3 | 11.3 |

SELECT

Table E

| | |
|---|---|
| 1 | INK COMPOSITION |
| 2 | TOTAL INK USE AMOUNT UPPER LIMIT VALUE |
| 2 | PRIMARY COLOR INK USE AMOUNT UPPER LIMIT VALUE |
| 2 | SECONDARY COLOR INK USE AMOUNT UPPER LIMIT VALUE |
| 2 | DEGREE OF CLOSENESS TO COLOR CHANGE TABLE |

| CLCMLmYKOrVi | MATCH |
|---|---|
| 200 % | 0 |
| 90 % | 10 |
| 110 % | 10 |
| 9.4 | 9.4 |

SELECT

IMAGE PROCESSING DEVICE, IMAGE PROCESSING METHOD, AND IMAGE PROCESSING PROGRAM

The present application is based on, and claims priority from JP Application Serial Number 2021-183113, filed Nov. 10, 2021, the disclosure of which is hereby incorporated by reference herein in its entirety.

BACKGROUND

1. Technical Field

The present disclosure relates to an image processing device, an image processing method, and an image processing program.

2. Related Art

A printing system that converts input image data into print data by using a conversion table is known. A printing system disclosed in JP-A-2009-220356 includes a printer, a computer, and a display device. The computer disclosed in JP-A-2009-220356 stores a conversion table corresponding to each type of paper. The computer stores a correspondence table indicating a correspondence between an ejection limit value and the type of paper. The computer selects the type of paper to be printed by the printer based on the ejection limit value input to a setting screen displayed on the display device and the correspondence table. The computer converts the input image data into the print data by using a conversion table corresponding to the selected type of paper.

A method in which a computer selects a conversion table when a plurality of setting values are input by a user is not shown.

SUMMARY

According to an aspect of the present disclosure, there is provided an image processing device coupled to a printing device that performs printing on a medium by ejecting ink having a plurality of colors, and configured to convert image data into ink amount data. The image processing device includes: an input unit configured to input a search condition; an acquisition unit configured to acquire a plurality of search values based on the search condition input by the input unit; a table storage unit storing a plurality of image conversion tables for converting the image data into the ink amount data; and a search unit configured to search the plurality of image conversion tables for a target image conversion table based on the plurality of search values acquired by the acquisition unit.

According to an aspect of the present disclosure, there is provided an image processing method of an image processing device coupled to a printing device that performs printing by ejecting ink having a plurality of colors on a medium. The image processing method includes: inputting a search condition; acquiring a plurality of search values based on the input search condition; and searching a plurality of image conversion tables for a target image conversion table based on the plurality of acquired search values.

According to an aspect of the present disclosure, there is provided a non-transitory computer-readable storage medium storing an image processing program executed by a processor of an image processing device coupled to a printing device that performs printing by ejecting ink having a plurality of colors on a medium. The image processing program causes the processor to execute inputting a search condition; acquiring a plurality of search values based on the input search condition; and searching a plurality of image conversion tables for a target image conversion table based on the plurality of acquired search values.

BRIEF DESCRIPTION OF THE DRAWINGS

FIG. 3 is a diagram showing a schematic configuration of a conversion table.

FIG. 7B is a diagram showing contents of a search tag added to a conversion table stored in the storage unit.

FIG. 7C is a diagram showing contents of a search tag added to a conversion table stored in the storage unit.

FIG. 10A is a diagram showing contents of a search tag added to a conversion table.

FIG. 10B is a diagram showing contents of a search tag added to a conversion table.

FIG. 10C is a diagram showing contents of a search tag added to a conversion table.

FIG. 11 is a diagram showing an outline of a search result screen.

FIG. 13A is a diagram showing contents of a search tag added to a conversion table.

FIG. 13B is a diagram showing contents of a search tag added to a conversion table.

FIG. 13C is a diagram showing contents of a search tag added to a conversion table.

FIG. 14 is a diagram showing an outline of a selection screen.

FIG. 17A is a diagram showing contents of a search tag added to a conversion table.

FIG. 17B is a diagram showing contents of a search tag added to a conversion table.

FIG. 17C is a diagram showing contents of a search tag added to a conversion table.

FIG. 18 is a diagram showing a search color change table.

FIG. 20 is a diagram showing the outline of the selection screen.

DESCRIPTION OF EXEMPLARY EMBODIMENTS

Figure 1:
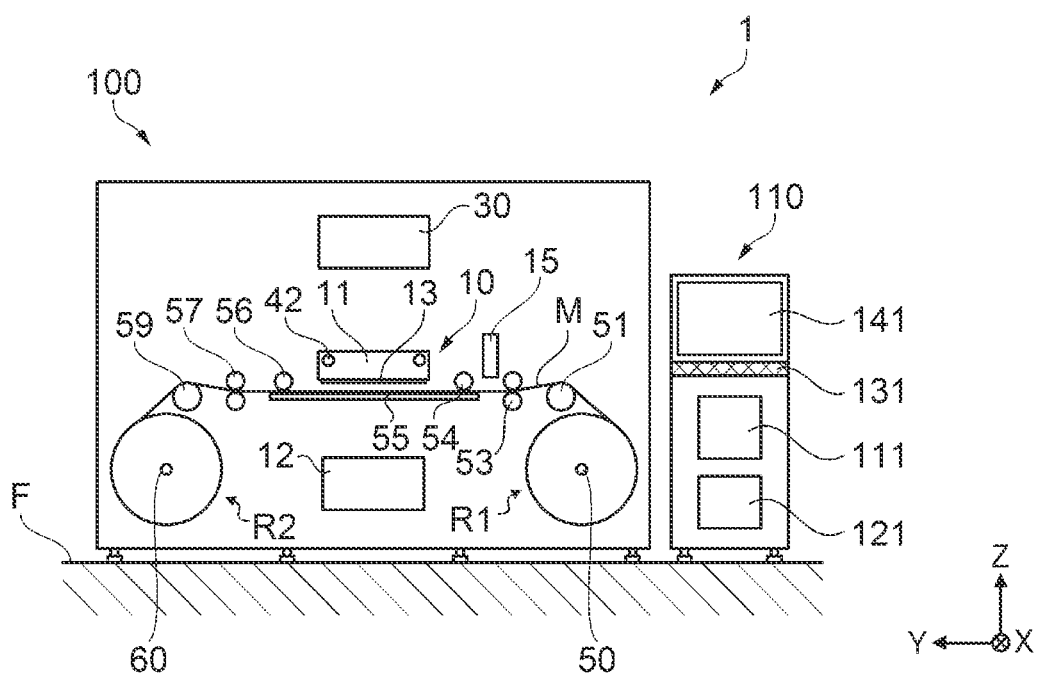
FIG. 1 is a diagram showing a schematic configuration of a printing system including a printer and a control device.

FIG. 1 is a diagram showing a schematic configuration of a printing system 1 including a printer 100 and a control device 110. In the printing system 1, the printer 100 and the control device 110 are communicably coupled. The printer 100 and the control device 110 shown in FIG. 1 are placed on an installation surface F. The printing system 1 may include a server 200 shown in FIG. 2. The server 200 will be described later. The printing system 1 corresponds to an example of an image processing system. The printer 100 corresponds to an example of a printing device. The control device 110 corresponds to an example of an image processing device. The server 200 corresponds to an example of an external device.

The printing system 1 includes the printer 100 and the control device 110. The printer 100 prints an image on a print medium M based on print data received from the control device 110. The print medium M corresponds to an example of a medium. The printer 100 shown in FIG. 1 prints an image on the print medium M wound around a medium roll R1. The printer 100 shown in FIG. 1 is an inkjet printer that prints a desired image by ejecting ink of a plurality of colors onto the print medium M.

FIG. 1 shows an XYZ coordinate system. An X axis, a Y axis, and a Z axis are orthogonal to one another. The X axis is parallel to the installation surface F of the printer 100. The X axis is an axis parallel to a rotation axis of the medium roll R1 placed in the printer 100. The rotation axis of the medium roll R1 is a virtual rotation center axis when the medium roll R1 rotates. A direction from a front side to a back side of FIG. 1 is a +X direction. A direction from the back side to the front side of FIG. 1 is a −X direction. The Y axis is parallel to the installation surface F of the printer 100. The Y axis is an axis parallel to an axis orthogonal to the rotation axis of the medium roll R1. A direction from a right side to a left side of the printer 100 shown in FIG. 1 is a +Y direction. A direction from the left side to the right side of the printer 100 shown in FIG. 1 is a −Y direction. The Z axis is an axis perpendicular to the installation surface F of the printer 100. A direction from the installation surface F to an upper side is a +Z direction. A direction from the upper side toward the installation surface F is a −Z direction.

The control device 110 is a computer including a control unit 111, a storage unit 121, a reception unit 131, and a display unit 141. The control device 110 generates the print data for causing the printer 100 to execute printing.

The control device 110 operates by executing a program. The program executed by the control device 110 is an image processing application, a printer driver, or the like. The image processing application generates image data to be printed. The printer driver generates the print data for causing the printer 100 to execute printing based on the image data. The image data is digital image information represented in an input image color space including text data, full-color image data, and the like. The printer driver corresponds to an example of the image processing program.

The control unit 111 is a controller that executes the programs such as the image processing application and the printer driver. The control unit 111 functions as a functional unit by executing the program. The control unit 111 may include a central processing unit (CPU), an application specific integrated circuit (ASIC), a digital signal processor (DSP), and the like. The control unit 111 may include a random access memory (RAM) and a read only memory (ROM) as a work area.

The storage unit 121 stores various programs executed by the control unit 111 and various data. The various data include information on the printer 100 coupled to the control device 110 and conversion tables 125. The storage unit 121 stores various tables to be described later. The storage unit 121 includes the RAM, the ROM, and the like. The storage unit 121 may include a magnetic storage device such as a hard disk drive (HDD) and a semiconductor memory. The storage unit 121 corresponds to an example of a table storage unit.

The reception unit 131 receives data input by a user operation. The reception unit 131 includes input devices such as a keyboard and a mouse. The reception unit 131 may be a touch panel that receives a touch operation by a user. The reception unit 131 may be coupled to an external input device. The data received by the reception unit 131 is transmitted to an input interface 133 to be described later.

The display unit 141 displays various kinds of information. The display unit 141 includes a display. The display is formed by a liquid crystal panel or an organic electro-luminescence (EL) panel. When the reception unit 131 is formed by the touch panel, the display unit 141 may be formed by the display integrated with the touch panel.

The printer 100 includes a support shaft 50, a feed roller 51, a first conveyance roller pair 53, a colorimetric unit 15, a first roller 54, a head unit 10, an ink supply unit 12, guide shafts 42, a platen 55, a print control unit 30, a second roller 56, a second conveyance roller pair 57, a winding roller 59, and a winding shaft 60.

The support shaft 50 rotatably supports the medium roll R1. The support shaft 50 rotates to feed the print medium M wound around the medium roll R1 toward the head unit 10. The support shaft 50 may be coupled to a rotation drive mechanism (not shown). The support shaft 50 may be rotated by a rotation driving force of the rotation drive mechanism.

The feed roller 51 winds the print medium M fed from the medium roll R1. The feed roller 51 guides the print medium M to the first conveyance roller pair 53. The feed roller 51 may apply tension to the print medium M. The feed roller 51 applies the tension to the print medium M to stabilize conveyance of the print medium M.

The first conveyance roller pair 53 conveys the print medium M toward the head unit 10. The first conveyance roller pair 53 includes two conveyance rollers. At least one of the two conveyance rollers is rotated by a conveyance roller drive mechanism (not shown). The first conveyance roller pair 53 shown in FIG. 1 conveys the print medium M in the +Y direction toward the head unit 10 and in the −Y direction opposite to the direction toward the head unit 10.

The colorimetric unit 15 performs colorimetry on an image printed on the print medium M. The colorimetric unit 15 includes an image sensor such as a contact image sensor (CIS) or a charge coupled device (CCD). The colorimetric unit 15 shown in FIG. 1 reads an entire width of the print medium M parallel to the X axis. In the printer 100 shown in FIG. 1, the colorimetric unit 15 performs the colorimetry on a surface of the print medium M positioned between the first conveyance roller pair 53 and the head unit 10. The printer 100 shown in FIG. 1 conveys the print medium M in the −Y direction. The colorimetric unit 15 shown in FIG. 1 performs the colorimetry on the surface of the print medium M conveyed in the −Y direction. A position of the colorimetric unit 15 is not limited to a position between the first conveyance roller pair 53 and the head unit 10. The colorimetric unit 15 may be disposed at a position between the head unit 10 and the second conveyance roller pair 57 on a conveyance path of the print medium M.

The first roller 54 is in contact with the surface of the print medium M. The first roller 54 is in contact with the platen 55 via the print medium M. The first roller 54 and the platen 55 sandwich the print medium M at a position of the head unit 10 in the −Y direction. The first roller 54 shown in FIG. 1 is in contact with the surface of the print medium M on a +Z direction side.

The head unit 10 prints an image on the print medium M. The head unit 10 includes a carriage 11 and a head 13. The head unit 10 is supported by the guide shafts 42. The head unit 10 prints the image on the print medium M under control of the print control unit 30. The head unit 10 corresponds to an example of a printing unit.

The carriage 11 supports the head 13. The carriage 11 is moved along the guide shafts 42 by a carriage drive mechanism (not shown). The carriage 11 shown in FIG. 1 is moved in a direction parallel to the X axis. By moving the carriage 11, the head 13 is caused to perform scanning on the print medium M.

The head 13 includes a plurality of nozzles (not shown). The plurality of nozzles eject ink. While the head 13 performs the scanning by the carriage 11, the plurality of nozzles eject the ink. The head 13 causes the plurality of nozzles to eject the ink, so that an image is printed on the print medium M. Each of the plurality of nozzles ejects ink having any one of eight colors including cyan ink, light cyan ink, magenta ink, light magenta ink, yellow ink, black ink, orange ink, and violet ink.

The ink supply unit 12 holds ink having a plurality of colors. The ink supply unit 12 supplies the held ink having the plurality of colors to the head 13. The ink supply unit 12 shown in FIG. 1 holds ink sets of eight colors of cyan, light cyan, magenta, light magenta, yellow, black, orange, and violet. The ink supply unit 12 may hold an ink set to which fluorescent ink is added. The ink supply unit 12 holds the ink by an ink tank or an ink cartridge. The ink supply unit 12 supplies the ink to the head 13 via an ink supply path (not shown). The ink tank or the ink cartridge, the ink supply path, and an ink supply passage to the nozzle for ejecting the ink are independently provided for each ink.

The printer 100 shown in FIG. 1 includes the carriage 11, but the present disclosure is not limited to this configuration. The printer 100 may use a line head as the head 13. When the head 13 is the line head, the line head is fixed during printing. The printer 100 moves the print medium M, so that the print medium M is moved relative to the line head.

The guide shafts 42 guide the movement of the carriage 11. The guide shafts 42 shown in FIG. 1 are disposed parallel to or substantially parallel to the X axis. As the carriage 11 moves along the guide shafts 42, the head 13 performs the scanning in the direction along the X axis.

The platen 55 supports the print medium M. The platen 55 is disposed at a position where the platen 55 faces the head unit 10. The platen 55 supports the print medium M on which the head unit 10 performs printing. The platen 55 shown in FIG. 1 is disposed at a position in the −Z direction with respect to the head unit 10. The platen 55 may have absorption holes (not shown).

The second roller 56 is in contact with the surface of the print medium M. The second roller 56 is in contact with the platen 55 via the print medium M. The second roller 56 and the platen 55 sandwich the print medium M at a position in the +Y direction with respect to the head unit 10. The second roller 56 shown in FIG. 1 is in contact with the surface of the print medium M on the +Z direction side. The first roller 54 and the second roller 56 are in contact with the print medium M to prevent the print medium M from floating.

The second conveyance roller pair 57 conveys the print medium M printed by the head unit 10 toward a winding roll R2. The second conveyance roller pair 57 includes two conveyance rollers. At least one of the two conveyance rollers may be rotated by the conveyance roller drive mechanism (not shown).

The winding roller 59 winds the print medium M. The winding roller 59 applies tension to the print medium M between the second conveyance roller pair 57 and the winding roll R2. The winding roller 59 may be coupled to a tension adjustment mechanism (not shown).

The winding shaft 60 rotatably supports the winding roll R2. The winding shaft 60 detachably supports the winding roll R2. The winding shaft 60 may be rotationally driven by a winding shaft drive mechanism (not shown). The winding shaft 60 may support the winding roll R2 via a roll core.

Figure 2:
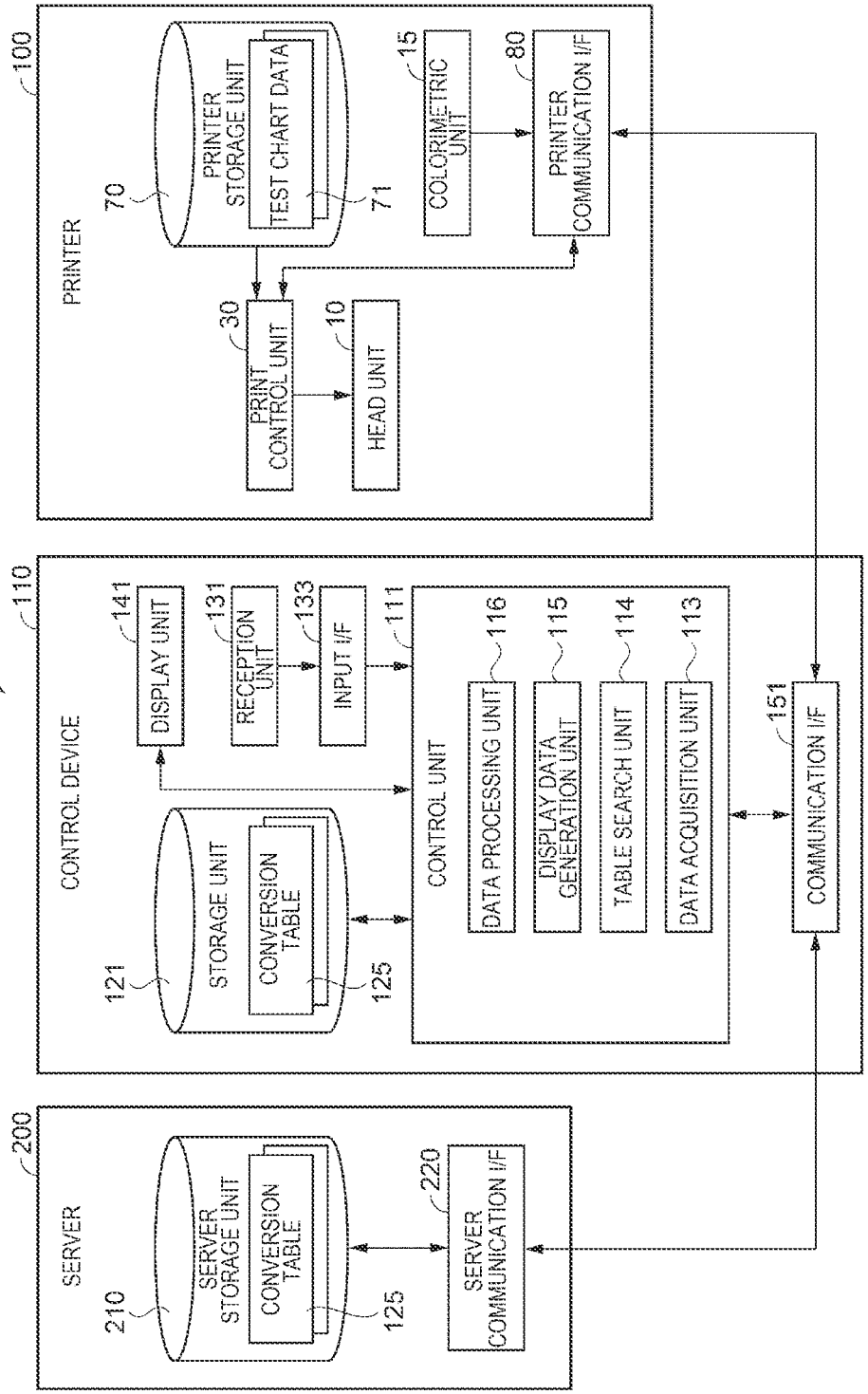
FIG. 2 is a diagram showing block configurations of the printing system.

FIG. 2 is a diagram showing the block configurations of the printing system 1. The printing system 1 shown in FIG. 2 includes the printer 100, the control device 110, and the server 200. FIG. 2 shows a block configuration of the printer 100, a block configuration of the control device 110, and a block configuration of the server 200. FIG. 2 shows a flow of each data in a simplified manner.

The printer 100 includes the head unit 10, the colorimetric unit 15, the print control unit 30, a printer storage unit 70, and a printer communication interface 80. In FIG. 2, the interface is represented as an I/F.

The printer storage unit 70 stores programs executed by the print control unit 30 and various data. The printer storage unit 70 includes the RAM, the ROM, and the like. The printer storage unit 70 stores a plurality pieces of test chart data 71. The plurality pieces of test chart data 71 include ink amount adjustment test chart data, profile adjustment test chart data, and the like. The ink amount adjustment test chart data is print data used when the printer 100 prints an ink amount adjustment test chart on the print medium M. The profile adjustment test chart data is print data used when the printer 100 prints a profile adjustment test chart on the print medium M.

The print control unit 30 reads the test chart data 71 stored in the printer storage unit 70. The print control unit 30 reads the ink amount adjustment test chart data and causes the head unit 10 to print the ink amount adjustment test chart on the print medium M. The print control unit 30 reads the profile adjustment test chart data and causes the head unit 10 to print the profile adjustment test chart on the print medium M. Alternatively, the print control unit 30 controls the head unit 10 to print the print data received by the printer communication interface 80.

The head unit 10 prints the ink amount adjustment test chart on the print medium M based on the ink amount adjustment test chart data. The head unit 10 prints the profile adjustment test chart on the print medium M based on the profile adjustment test chart data. Alternatively, the head unit 10 prints an image on the print medium M based on the print data.

The printer communication interface 80 communicates with the control device 110. The printer communication interface 80 couples to and communicates with the control device 110 via a wired or wireless communication path. The printer communication interface 80 transmits colorimetric data output from the colorimetric unit 15 or ink amount adjustment data to the control device 110. The printer communication interface 80 receives various data such as the print data transmitted from the control device 110.

The control device 110 includes the control unit 111, the storage unit 121, the reception unit 131, the input interface 133, the display unit 141, and a communication interface 151. The control device 110 is coupled to the printer 100 via the communication interface 151. The control device 110 is coupled to the server 200 via the communication interface 151.

The input interface 133 inputs data received by the reception unit 131. The input interface 133 inputs input data such as data input to an input screen 160, which will be described later, from the reception unit 131. The input interface 133 transmits the input input data to the control unit 111. The input interface 133 corresponds to an example of an input unit.

The control unit 111 causes a data acquisition unit 113, a table search unit 114, a display data generation unit 115, and a data processing unit 116 to function. The data acquisition unit 113, the table search unit 114, the display data generation unit 115, and the data processing unit 116 are functional units. The control unit 111 causes the functional units to function by executing the printer driver.

The data acquisition unit 113 acquires the input data from the input interface 133. The input data includes a plurality of setting values input to the input screen 160 to be described later. The plurality of setting values correspond to an example of search conditions. The data acquisition unit 113 acquires the plurality of input setting values as a plurality of search parameters. The data acquisition unit 113 may generate the search parameters from the input setting values. The data acquisition unit 113 acquires the plurality of search parameters based on the plurality of input setting values. The data acquisition unit 113 may generate the search parameters from the information on the printer 100 stored in the storage unit 121. The data acquisition unit 113 may include information indicating a priority order for the plurality of search parameters. The information indicating the priority order is used as a weighting of the search parameter when the data acquisition unit 113 extracts the desired conversion table 125 from the plurality of search parameters. The information indicating the priority order may be used when the conversion table 125 is selected from the storage unit 121 or a server storage unit 210 to be described later. The information indicating the priority order corresponds to an example of priority order information. The data acquisition unit 113 corresponds to an example of an acquisition unit. The search parameter corresponds to an example of a search value.

The data acquisition unit 113 acquires the conversion table 125 from the server 200 via the communication interface 151. The data acquisition unit 113 acquires the colorimetric data measured by the colorimetric unit 15 from the printer 100 via the communication interface 151. The colorimetric data is a colorimetric result of the profile adjustment test chart printed by the head unit 10.

The table search unit 114 searches the conversion table 125 using the plurality of search parameters. The table search unit 114 receives the plurality of search parameters from the data acquisition unit 113. The table search unit 114 searches the conversion table 125 stored in the storage unit 121 using the plurality of search parameters.

The table search unit 114 selects the desired conversion table 125 from the plurality of conversion tables 125 using the plurality of search parameters. The table search unit 114 identifies the selected desired conversion table 125 as a target conversion table. Alternatively, the table search unit 114 identifies the target conversion table based on the data from the user received by the reception unit 131. The table search unit 114 corresponds to an example of a search unit. The target conversion table corresponds to an example of a target image conversion table.

The table search unit 114 may select the desired conversion table 125 from the plurality of conversion tables 125 based on the information indicating the priority order. As an example, the table search unit 114 sets a search parameter having a high priority order as an essential condition at the time of selecting the conversion table 125. The table search unit 114 does not set a search parameter having a low priority order as the essential condition at the time of selecting the conversion table 125. The table search unit 114 may search the desired conversion table 125 by weighting the search parameters. The table search unit 114 selects the desired conversion table 125 using the plurality of weighted search parameters. The table search unit 114 identifies the selected desired conversion table 125 as the target conversion table.

The plurality of search parameters include the information indicating the priority order of the plurality of search parameters, and the table search unit 114 searches the target conversion table using the information indicating the priority order.

The control device 110 can search the target conversion table based on the information indicating the priority order of the plurality of search parameters. The control device 110 can select the target conversion table based on a request of the user.

The table search unit 114 may search data included in the conversion table 125 for a parameter matching the search parameter. The table search unit 114 may identify the conversion table 125 having the parameter matching the search parameter as the target conversion table.

The table search unit 114 may search a plurality of parameters included in a search tag added to the conversion table 125 for the parameter matching the search parameter. The search tag including the plurality of parameters is added to the conversion table 125 in advance. The parameter is a value corresponding to a type of the search parameter. The table search unit 114 may select the desired conversion table 125 by searching the parameters included in the search tag. The table search unit 114 identifies the selected desired conversion table 125 as the target conversion table. The search tag corresponds to an example of a tag. The parameters included in the search tag correspond to an example of additional data.

The conversion table 125 has the search tag including the plurality of parameters respectively corresponding to the plurality of search parameters. The table search unit 114 compares the plurality of search parameters with the plurality of parameters included in the search tag, and searches the target conversion table.

The control device 110 can easily select the desired conversion table 125 and identify the desired conversion table 125 as the target conversion table.

The table search unit 114 transmits the plurality of search parameters to the server 200 via the communication interface 151. The table search unit 114 receives one or more conversion tables 125 by transmitting the plurality of search parameters to the server 200. The table search unit 114 is caused to search the server storage unit 210 of the server 200 for the desired conversion table 125.

The table search unit 114 receives, for example, the conversion table 125 having the search tag including the parameter matching the search parameter from the server 200. The table search unit 114 identifies the received conversion table 125 as the target conversion table. Alternatively, the table search unit 114 receives the conversion table 125 having a search tag including a parameter approximate to the search parameter from the server 200. The table search unit 114 identifies the received conversion table 125 as a candidate conversion table. The candidate conversion table corresponds to an example of a candidate image conversion table.

The display data generation unit 115 generates display screen data to be displayed on the display unit 141. The display screen data includes input screen display data for displaying the input screen 160, which will be described later, on the display unit 141. The display screen data includes result screen display data for displaying a search result screen 170, which will be described later, on the display unit 141. The display screen data includes selection screen display data for displaying a selection screen 180, which will be described later, on the display unit 141. The display data generation unit 115 transmits the generated display screen data to the display unit 141. The display data generation unit 115 displays the transmitted display screen data on the display unit 141. The display data generation unit 115 corresponds to an example of a display control unit.

The data processing unit 116 converts the image data into the print data using the conversion table 125. The print data includes ink ejection amount data. The ink ejection amount data corresponds to an example of ink amount data. The control device 110 converts the image data into the ink ejection amount data by the data processing unit 116. The data processing unit 116 converts the image data into the print data including the ink ejection amount data by using the target conversion table identified by the table search unit 114. The data processing unit 116 transmits the print data to the printer 100 via the communication interface 151.

The storage unit 121 stores various data including the information on the printer 100 and the plurality of conversion tables 125. The storage unit 121 may store the image data generated by the image processing application in advance. The storage unit 121 may store the image data received by the communication interface 151.

The information on the printer 100 is acquired from the printer 100 when the control device 110 is coupled to the printer 100. When the printer driver corresponding to the printer 100 is installed in the control device 110, the information on the printer 100 may be acquired. The information on the printer 100 includes an ink composition of the ink used in the printer 100, a resolution of the printer 100, and the like. The information on the printer 100 may include information on the print medium M provided in the printer 100.

The conversion table 125 is a lookup table for converting the image data into the ink ejection amount data. FIG. 3 shows a schematic configuration of the conversion table 125. FIG. 3 shows the conversion table 125 including an input channel value 127, an ink amount 128, and a maximum ink amount 129. Each row of the conversion table 125 indicates the ink amount 128 and the maximum ink amount 129 for the input channel value 127. The conversion table 125 corresponds to an example of an image conversion table.

The input channel value 127 indicates image data of an input color system. The input channel value 127 indicates image data in a CMYK color space. C represents cyan. M represents magenta. Y represents yellow. K represents black. Each color of CMYK shows a gradation indicated by numerical values from 0 to 100. The control device 110 converts the input image data into the input channel value 127.

The ink amount 128 is a value for converting the input channel value 127. The input channel values 127 of the rows are converted into the ink amounts 128 of rows respectively matching the rows. Reference numerals C, Lc, M, Lm, Y, K, Or, and Vi indicate ink colors. The reference numerals C, Lc, M, Lm, Y, K, Or, and Vi represent cyan, light cyan, magenta, light magenta, yellow, black, orange, and violet, respectively. Columns corresponding to the respective ink colors indicate the ink amounts 128 of the corresponding ink colors, respectively. The ink amount 128 shown in FIG. 3 is represented by a gradation value in which a maximum value of an ink ejection amount is 100%. The ink amount of 100% indicates an ink amount when a predetermined number of ink dots are ejected to a region where a predetermined number of ink dots having a predetermined size can be ejected.

The maximum ink amount 129 indicates a maximum amount of the ink amount 128 when each piece of image data indicated by the input channel value 127 is converted into the ink amount 128. The maximum ink amount 129 includes a maximum primary color amount, a maximum secondary color amount, and a maximum total ink amount. The maximum primary color amount indicates a maximum ink amount of one color among the cyan ink, the light cyan ink, the magenta ink, the light magenta ink, the yellow ink, the black ink, the orange ink, and the violet ink. For example, a sixth row from a top in FIG. 3 shows that an amount of the cyan ink is 20.0%, an amount of the light cyan ink is 20.0%, an amount of the yellow ink is 100.0%, and an amount of the violet ink is 20.0%. At this time, the maximum primary color amount is the amount of the yellow ink of 100.0%.

The maximum secondary color amount indicates a maximum ink amount of two combined colors among the cyan ink, the light cyan ink, the magenta ink, the light magenta ink, the yellow ink, the black ink, the orange ink, and the violet ink. In the case of the sixth row from the top in FIG. 3, the maximum secondary color amount is 120.0%, which is obtained by adding the amount of the cyan ink of 20.0% to the amount of the yellow ink of 100.0%. In the case of the sixth row from the top in FIG. 3, the amount of the cyan ink, the amount of the light cyan ink, and the amount of the violet ink are the same. The maximum secondary color amount may be 120.0% which is obtained by adding the amount of the light cyan ink of 20.0% to the amount of the yellow ink of 100.0%. The maximum secondary color amount may be 120.0% which is obtained by adding the amount of the violet ink of 20.0% to the amount of the yellow ink of 100.0%.

The maximum total ink amount is a total ink amount of the cyan ink, the light cyan ink, the magenta ink, the light magenta ink, the yellow ink, the black ink, the orange ink, and the violet ink. In the case of the sixth row from the top in FIG. 3, the maximum total ink amount is 160.0%.

FIG. 3 shows the lookup table for nine input channel values 127 in a simplified manner. The conversion table 125 indicates a conversion value for a gradation of each color included in the input channel value 127. A largest value of the maximum primary color amount is a primary color ink use amount upper limit value. A largest value of the maximum secondary color amount is a secondary color ink use amount upper limit value. A largest value of the maximum total ink amount is a total ink use amount upper limit value. The maximum ink amount 129 may not be included in the conversion table 125. The maximum primary color amount, the maximum secondary color amount, and the maximum total ink amount can be calculated based on each piece of data included in the ink amount 128. The primary color ink use amount upper limit value, the secondary color ink use amount upper limit value, and the total ink use amount upper limit value are parameters. It is preferable that the search tag is added to the conversion table 125. The primary color ink use amount upper limit value, the secondary color ink use amount upper limit value, and the total ink use amount upper limit value are included in the search tag as the parameters.

The conversion table 125 is generated in advance by a manufacturer of the printer 100 or the like as a lookup table corresponding to various conditions such as the primary color ink use amount upper limit value and a type of the print medium M. Color reproducibility of an image printed on the print medium M varies depending on a maximum ink use amount and the type of the print medium M. The user of the printer 100 prints the print data converted by using the conversion table 125 corresponding to the various conditions such as the maximum ink use amount and the type of the print medium M. The user uses the conversion table 125 corresponding to the various conditions, so that the reproducibility of the image printed on the print medium M can be improved. The conversion table 125 corresponding to the various conditions is the target conversion table. The conversion table 125 generated in advance is stored in the storage unit 121 of the control device 110 in which the printer driver corresponding to the predetermined server 200 and the printer 100 is installed. The predetermined server 200 is provided by, for example, the manufacturer of the printer 100.

The communication interface 151 shown in FIG. 2 communicates with the printer 100 and the server 200. The communication interface 151 couples to and communicates with the printer 100 and the server 200 via a wired or wireless communication path. The communication interface 151 receives the colorimetric data and the information on the printer 100 transmitted from the printer 100. The communication interface 151 transmits various data such as the print data to the printer 100. The communication interface 151 transmits the search parameter to the server 200. The communication interface 151 receives the conversion table 125 corresponding to the search parameter. The communication interface 151 corresponds to an example of a communication unit.

The control device 110 is coupled to the printer 100 that performs printing on the print medium M by ejecting the ink having the plurality of colors, and converts the image data into the ink ejection amount data. The control device 110 includes the input interface 133 for inputting a plurality of setting values, the data acquisition unit 113 that acquires the plurality of search parameters based on the plurality of setting values input to the input interface 133, the storage unit 121 that stores the plurality of conversion tables 125 for converting the image data into the ink ejection amount data, and the table search unit 114 that searches the plurality of conversion tables 125 for the target conversion table based on the plurality of search parameters acquired by the data acquisition unit 113.

The control device 110 can acquire the plurality of search parameters and search the target conversion table based on the plurality of acquired search parameters.

Figure 4:
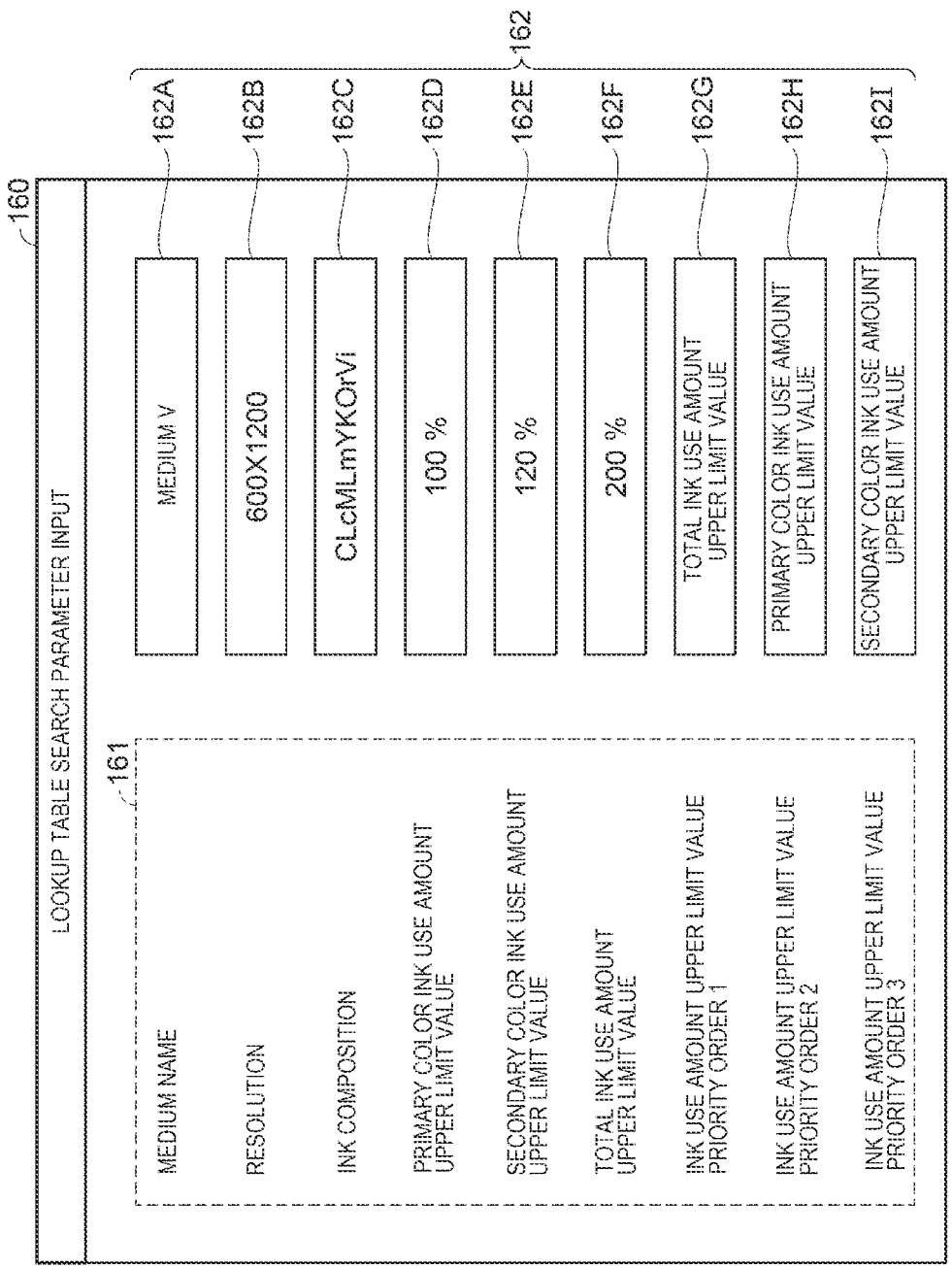
FIG. 4 is a diagram showing an outline of an input screen displayed on a display unit.

FIG. 4 shows an outline of the input screen 160 displayed on the display unit 141. The input screen 160 shown in FIG. 4 is an example. The input screen 160 shown in FIG. 4 displays a setting item display field 161 and a setting value input field 162. The setting value is input to the input screen 160 by the input devices of the reception unit 131. When the display unit 141 is a touch panel and the touch panel receives a touch operation from the user, the setting value is input to the input screen 160.

The setting item display field 161 displays various setting items. The setting item display field 161 shown in FIG. 4 shows, as the setting items, a medium name, a resolution, an ink composition, the primary color ink use amount upper limit value, the secondary color ink use amount upper limit value, the total ink use amount upper limit value, an ink use amount upper limit value priority order 1, an ink use amount upper limit value priority order 2, and an ink use amount upper limit value priority order 3. The setting items displayed in the setting item display field 161 are not limited to a configuration of FIG. 4. The number of setting items to be displayed may be larger or smaller than the number of setting items shown in FIG. 4, and the setting items may be different from the setting items shown in FIG. 4. In the setting item display field 161 shown in FIG. 4, a plurality of setting items are fixedly displayed, but the present disclosure is not limited thereto. The user of the printer 100 may select and display the setting items. The user of the printer 100 may display, for example, a plurality of ink use amount upper limit value priority orders 2 as the setting items.

The setting value input field 162 is formed to be capable of inputting a setting value corresponding to each setting item displayed in the setting item display field 161. The setting value input field 162 is input by the user of the printer 100. A name of the print medium M to be printed by the printer 100 is input to a medium name input field 162A. A print resolution of the printer 100 is input to a resolution input field 162B. An ink composition used in the printer 100 is input to an ink composition input field 162C. A maximum setting value of a use amount of a single color ink is input to a primary color upper limit value input field 162D. The setting value input to the primary color upper limit value input field 162D corresponds to an example of a primary color ink use amount limit value. In a secondary color upper limit value input field 162E, a maximum setting value of a use amount of ink of two colors at the time of generating a mixed color image is input. The setting value input to the secondary color upper limit value input field 162E corresponds to an example of a secondary color ink use amount limit value. In a total ink upper limit value input field 162F, a maximum setting value of a total use amount of ink of a plurality of colors at the time of generating a mixed color image is input. The setting value input to the total ink upper limit value input field 162F corresponds to an example of a total ink use amount limit value. A setting item of a first priority order is input to a first priority order input field 162G. The setting value input to the first priority order input field 162G corresponds to an example of information indicating a priority order. A setting item of a second priority order is input to a second priority order input field 162H. The setting value input to the second priority order input field 162H corresponds to an example of the information indicating the priority order. A setting item of a third priority order is input to a third priority order input field 162I. The setting value input to the third priority order input field 162I corresponds to an example of the information indicating the priority order.

In the medium name input field 162A shown in FIG. 4, "medium V" is input as the setting value. The "medium V" indicates the name of the print medium M. The user of the printer 100 inputs the name of the print medium M used for printing by the printer 100.

In the resolution input field 162B shown in FIG. 4, "600×1200" is input as the setting value. The "600×1200" indicates the resolution of the printer 100. The user of the printer 100 inputs the resolution as a specification value of the printer 100 or a settable resolution.

In the ink composition input field 162C shown in FIG. 4, "CLcMLmYKOrVi" is input as the setting value. The "CLcMLmYKOrVi" indicates the ink composition of the printer 100. The "CLcMLmYKOrVi" indicates an eight-color ink composition of cyan, light cyan, magenta, light magenta, yellow, black, orange, and violet. The user of the printer 100 inputs the ink composition as a specification of the printer 100 or a settable ink composition.

In the primary color upper limit value input field 162D shown in FIG. 4, "100%" is input as the setting value. The "100%" indicates that the maximum setting value of the use amount of the single color ink is 100%. The user of the printer 100 inputs a desired setting value with respect to the maximum setting value of the use amount of the single color ink.

In the secondary color upper limit value input field 162E shown in FIG. 4, "120%" is input as the setting value. The "120%" indicates that the maximum setting value of the use amount of ink of two colors when a mixed color image is generated by the ink of two colors is 120%. The user of the printer 100 inputs a desired setting value with respect to the maximum setting value of the use amount of the ink of two colors.

In the total ink upper limit value input field 162F shown in FIG. 4, "200%" is input as the setting value. The "200%" indicates that the maximum setting value of the total use amount of the ink of the plurality of colors when a mixed color image is generated by the ink of the plurality of colors is 200%. The user of the printer 100 inputs a desired setting value with respect to the maximum setting value of the use amount of the ink of the plurality of colors.

In the first priority order input field 162G shown in FIG. 4, "total ink use amount upper limit value" is input as the setting value. The "total ink use amount upper limit value" indicates that a setting item having a first priority is the total ink use amount upper limit value. The user of the printer 100 appropriately inputs the setting item of the first priority order.

In the second priority order input field 162H shown in FIG. 4, "primary color ink use amount upper limit value" is input as the setting value. The "primary color ink use amount upper limit value" indicates that a setting item having a second priority is the primary color ink use amount upper limit value. The user of the printer 100 appropriately inputs the setting item of the second priority order.

In the third priority order input field 162I shown in FIG. 4, "secondary color ink use amount upper limit value" is input as the setting value. The "secondary color ink use amount upper limit value" indicates that a setting item having a third priority is the secondary color ink use amount upper limit value. The user of the printer 100 appropriately inputs the setting item of the third priority order.

The first priority order input field 162G, the second priority order input field 162H, and the third priority order input field 162I shown in FIG. 4 are respectively selected from the total ink use amount upper limit value, the primary color ink use amount upper limit value, and the secondary color ink use amount upper limit value, but the present disclosure is not limited thereto. Other setting values may be input as the setting items of the first priority order, the second priority order, and the third priority order.

The data acquisition unit 113 generates the plurality of search parameters based on the plurality of setting values input to the input screen 160. As an example, the data acquisition unit 113 uses the setting value input to the primary color upper limit value input field 162D as the search parameter. The data acquisition unit 113 uses the setting value input to the secondary color upper limit value input field 162E as the search parameter. The data acquisition unit 113 generates the information indicating the priority order based on the setting values input to the first priority order input field 162G, the second priority order input field 162H, and the third priority order input field 162I.

The plurality of search parameters include the secondary color ink use amount upper limit value which is the maximum setting value of the use amount of the ink of two colors among the ink of the plurality of colors.

The control device 110 can select the target conversion table capable of performing image processing with good color reproducibility in a state in which an amount of the ink of two colors to be superimposed are limited.

First Embodiment

Figures 5, 6, 7A:
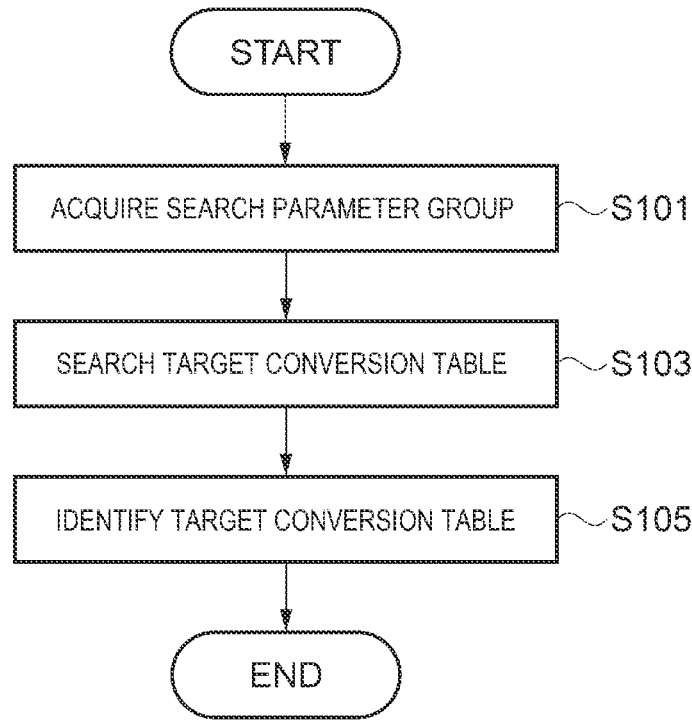
FIG. 5 is a flowchart for searching a target conversion table.
FIG. 6 is a diagram showing a plurality of search parameters included in a search parameter group in a table format.
FIG. 7A is a diagram showing contents of a search tag added to a conversion table stored in a storage unit.

FIG. 5 is a flowchart for searching the target conversion table. FIG. 5 shows the flowchart according to a first embodiment. The control device 110 performs an operation of each step shown in FIG. 5 by the control unit 111 executing the printer driver. FIG. 5 shows a case in which the control device 110 identifies the target conversion table from the plurality of conversion tables 125 stored in the storage unit 121. FIG. 6 shows a search parameter group including a plurality of search parameters used when searching the target conversion table in the flowchart of FIG. 5. FIG. 6 shows the plurality of search parameters included in the search parameter group in a table format. FIG. 6 shows a priority order of the plurality of search parameters. FIGS. 7A, 7B, and 7C show contents of search tags added to the plurality of conversion tables 125 stored in the storage unit 121. The search tags are respectively added to the plurality of conversion tables 125. In FIGS. 7A, 7B, and 7C, parameters corresponding to search items are extracted from a plurality of parameters included in the search tags and shown in the table format.

In step S101 of FIG. 5, the control device 110 acquires a search parameter group. The control device 110 causes the display unit 141 to display the input screen 160. The user inputs setting values for a plurality of setting items and a priority order of the plurality of setting items on the input screen 160. The data acquisition unit 113 acquires the search parameter group shown in FIG. 6 based on a plurality of setting values input by the user and the priority order of the plurality of setting items. FIG. 6 shows that the search items are the medium name and the resolution. The search parameters indicate that the medium name is "medium C" and the resolution is "1200×1200". In addition, FIG. 6 shows that the priority order of the search items is an order of the medium name and the resolution.

After the search parameter group is acquired, the control device 110 searches the target conversion table in step S103. In the first embodiment, the conversion table 125 having a search tag including a plurality of parameters matching the plurality of search parameters is identified as the target conversion table. The table search unit 114 searches the plurality of conversion tables 125 stored in the storage unit 121 for the target conversion table based on the search parameter group acquired by the data acquisition unit 113. As an example, the storage unit 121 stores the plurality of conversion tables 125 including a first conversion table, a second conversion table, and a third conversion table.

The first conversion table has the search tag shown in FIG. 7A. The search tag shown in FIG. 7A indicates "medium A" as a parameter related to the medium name. The search tag shown in FIG. 7A indicates "1200×1200" as a parameter related to the resolution. As compared with the search parameter group shown in FIG. 6, the resolution in the search tag matches that in the search parameter, but the medium name in the search tag does not match the medium name of the search parameter.

The second conversion table has the search tag shown in FIG. 7B. The search tag shown in FIG. 7B indicates "medium B" as the parameter related to the medium name. The search tag shown in FIG. 7B indicates "1200×1200" as the parameter related to the resolution. As compared with the search parameter group shown in FIG. 6, the resolution in the search tag matches that in the search parameter, but the medium name in the search tag does not match the medium name of the search parameter.

The third conversion table has the search tag shown in FIG. 7C. The search tag shown in FIG. 7C indicates "medium C" as the parameter related to the medium name. The search tag shown in FIG. 7C indicates "1200×1200" as the parameter related to the resolution. As compared with the search parameter group shown in FIG. 6, the medium name and the resolution in the search tag match the medium name and the resolution of the search parameter, respectively.

The table search unit 114 compares the plurality of search parameters with the plurality of parameters included in the search tag, and identifies the target conversion table in step S105. The table search unit 114 identifies the conversion table 125 having the search tag including the plurality of parameters matching the plurality of search parameters as the target conversion table. Hereinafter, the conversion table 125 having the search tag including the parameters is simply referred to as the conversion table 125 having the parameters. The table search unit 114 compares the search parameter group shown in FIG. 6 with the search tags shown in FIGS. 7A, 7B, and 7C. The table search unit 114 determines that the search parameter group shown in FIG. 6 matches the plurality of parameters included in the search tag shown in FIG. 7C. The table search unit 114 identifies the third conversion table having the search tag shown in FIG. 7C as the target conversion table. When the table search unit 114 identifies the target conversion table, the control device 110 ends the search of the target conversion table.

An image processing method performed by the control device 110 coupled to the printer 100 that performs printing by ejecting the ink of the plurality of colors onto the print medium M includes: inputting a plurality of setting values; acquiring a plurality of search parameters based on the plurality of setting values; and searching the plurality of conversion tables 125 for a target conversion table based on the plurality of acquired search parameters.

The control device 110 can acquire the plurality of search parameters and search the target conversion table based on the plurality of acquired search parameters.

The printer driver executed by the control unit 111 of the control device 110 coupled to the printer 100 that performs printing by ejecting the ink of the plurality of colors onto the print medium M causes a plurality of setting values to be input, causes a plurality of search parameters to be acquired based on the plurality of input setting values, and causes a target conversion table to be searched from the plurality of conversion tables 125 based on the plurality of acquired search parameters.

The printer driver can acquire the plurality of search parameters and search the target conversion table based on the plurality of acquired search parameters.

Second Embodiment

Figures 8, 9:
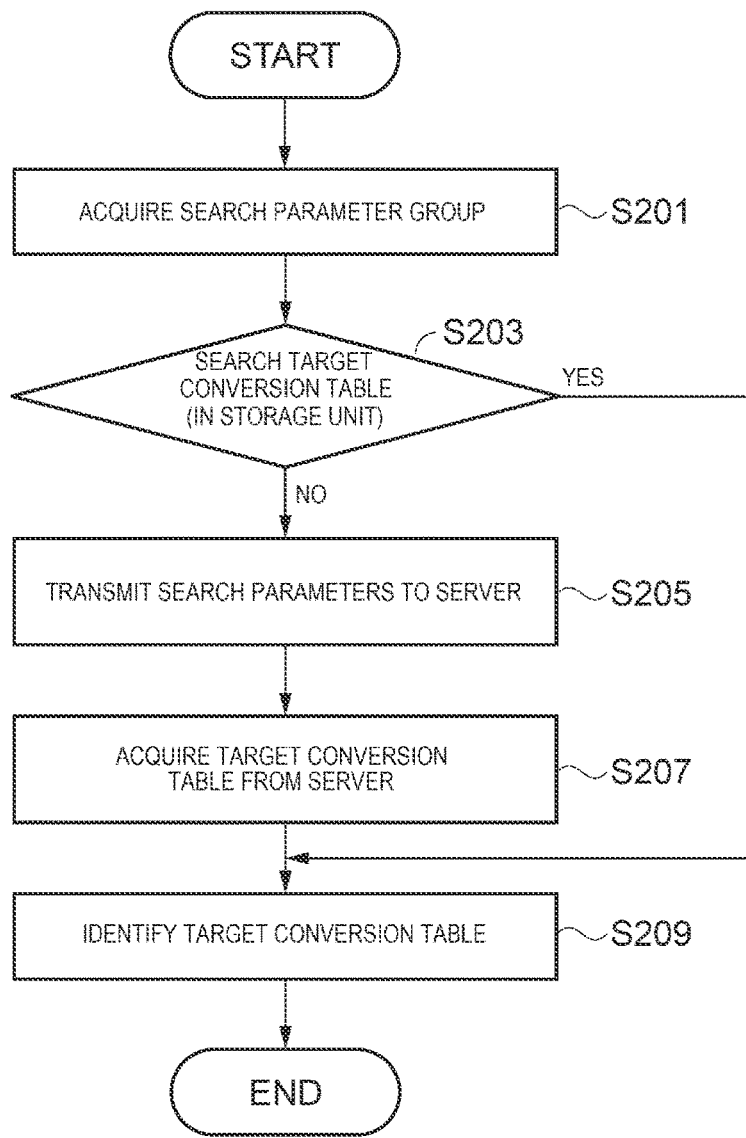
FIG. 8 is a flowchart for searching the target conversion table.
FIG. 9 is a diagram showing a plurality of search parameters included in a search parameter group in the table format.

FIG. 8 is a flowchart for searching the target conversion table. FIG. 8 shows the flowchart according to a second embodiment. The control device 110 performs an operation of each step shown in FIG. 8 by the control unit 111 executing the printer driver. FIG. 8 shows a case in which the control device 110 searches the plurality of conversion tables 125 stored in the storage unit 121 and the conversion table 125 stored in the server storage unit 210 of the server 200. FIG. 9 shows, in the table format, a search parameter group including a plurality of search parameters used when searching the target conversion table in the flowchart of FIG. 8. FIG. 9 shows a priority order of the plurality of search parameters. FIGS. 10A, 10B, and 10C show contents of search tags added to the plurality of conversion tables 125 stored in the storage unit 121 or the server storage unit 210. The search tags are respectively added to the plurality of conversion tables 125. In FIGS. 10A, 10B, and 10C, parameters corresponding to search items are extracted from parameters included in the search tags and shown in the table format.

In step S201 of FIG. 8, the control device 110 acquires a search parameter group. The control device 110 causes the display unit 141 to display the input screen 160. The user inputs setting values for a plurality of setting items and a priority order of the plurality of setting items on the input screen 160. The data acquisition unit 113 acquires the search parameter group shown in FIG. 9 based on a plurality of setting values input by the user and the priority order of the plurality of setting items.

FIG. 9 shows that the search items are the ink composition, the total ink use amount upper limit value, the primary color ink use amount upper limit value, and the secondary color ink use amount upper limit value. FIG. 9 shows that a search parameter related to the ink composition is "CLcMLmYKOrVi". FIG. 9 shows that a search parameter related to the total ink use amount upper limit value is "200%". FIG. 9 shows that a search parameter related to the primary color ink use amount upper limit value is "100%". FIG. 9 shows that a search parameter related to the secondary color ink use amount upper limit value is "120%". FIG. 9 shows that the priority order of the search items is an order of the ink composition, the total ink use amount upper limit value, the primary color ink use amount upper limit value, and the secondary color ink use amount upper limit value.

After the search parameter group is acquired, the control device 110 searches the target conversion table in step S203. In step S203, the control device 110 searches the plurality of conversion tables 125 stored in the storage unit 121 for the target conversion table. In the second embodiment, the conversion table 125 including a plurality of parameters matching a plurality of search parameters is identified as the target conversion table. The table search unit 114 searches the plurality of conversion tables 125 stored in the storage unit 121 for the target conversion table based on the search parameter group acquired by the data acquisition unit 113.

In the second embodiment, the storage unit 121 or the server storage unit 210 stores the plurality of conversion tables 125 including a fourth conversion table, a fifth conversion table, and a sixth conversion table.

The fourth conversion table has the search tag shown in FIG. 10A. The search tag shown in FIG. 10A indicates "CLcMLmYKOrVi" as the parameter related to the ink composition. The search tag shown in FIG. 10A indicates "200%" as the parameter related to the total ink use amount upper limit value. The search tag shown in FIG. 10A indicates "100%" as the parameter related to the primary color ink use amount upper limit value. The search tag shown in FIG. 10A indicates "120%" as the parameter related to the secondary color ink use amount upper limit value. As compared with the search parameters shown in FIG. 9, the ink composition, the total ink use amount upper limit value, the primary color ink use amount upper limit value, and the secondary color ink use amount upper limit value in the search tag match those of the search parameter group, respectively.

The fifth conversion table has the search tag shown in FIG. 10B. The search tag shown in FIG. 10B indicates "CLcMLmYKOrVi" as the parameter related to the ink composition. The search tag shown in FIG. 10B indicates "200%" as the parameter related to the total ink use amount upper limit value. The search tag shown in FIG. 10B indicates "90%" as the parameter related to the primary color ink use amount upper limit value. The search tag shown in FIG. 10B indicates "120%" as the parameter related to the secondary color ink use amount upper limit value. As compared with the search parameters shown in FIG. 9, the ink composition, the total ink use amount upper limit value, and the secondary color ink use amount upper limit value in the search tag match the search parameters included in the search parameter group, respectively. The primary color ink use amount upper limit value in the search tag does not match that of the search parameter.

The sixth conversion table has the search tag shown in FIG. 10C. The search tag shown in FIG. 10C indicates "CLcMLmYKOrVi" as the parameter related to the ink composition. The search tag shown in FIG. 10C indicates "150%" as the parameter related to the total ink use amount upper limit value. The search tag shown in FIG. 10C indicates "90%" as the parameter related to the primary color ink use amount upper limit value. The search tag shown in FIG. 10C indicates "120%" as the parameter related to the secondary color ink use amount upper limit value. As compared with the search parameters shown in FIG. 9, the ink composition and the secondary color ink use amount upper limit value included in the search tag match those of the search parameters, respectively. The total ink use amount upper limit value and the primary color ink use amount upper limit value included in the search tag do not match those of the search parameters.

In step S203, the table search unit 114 searches the plurality of conversion tables 125 stored in the storage unit 121 by using the search parameter group shown in FIG. 9. The table search unit 114 searches the conversion table 125 including the plurality of parameters matching the plurality of search parameters. The table search unit 114 searches whether the fourth conversion table is stored in the storage unit 121. When the table search unit 114 determines that the fourth conversion table is stored in the storage unit 121, the control device 110 proceeds to step S209. When the table search unit 114 determines that the fourth conversion table is not stored in the storage unit 121, the control device 110 proceeds to step S205.

When the table search unit 114 determines that the fourth conversion table is not stored in the storage unit 121, the control device 110 transmits the search parameter group shown in FIG. 9 to the server 200 in step S205. The table search unit 114 transmits the search parameter group to the server 200 via the communication interface 151.

When the search parameter group is received via a server communication interface 220, the server 200 searches the target conversion table. The server 200 searches the conversion table 125 stored in the server storage unit 210 by using the search parameter group. The server 200 extracts the fourth conversion table from the plurality of conversion tables 125 stored in the server storage unit 210. The server 200 transmits the extracted fourth conversion table to the control device 110 via the server communication interface 220. In step S207, the data acquisition unit 113 acquires the fourth conversion table from the server 200 via the communication interface 151. The data acquisition unit 113 transmits the acquired fourth conversion table to the table search unit 114.

The control device 110 receives the fourth conversion table from the server 200. The fourth conversion table is the conversion table 125 including the plurality of parameters matching the plurality of search parameters. In step S209, the control device 110 identifies the received fourth conversion table as the target conversion table. The table search unit 114 causes the server 200 to search the target conversion table by transmitting the plurality of search parameters to the server 200.

When the table search unit 114 determines in step S203 that the fourth conversion table is stored in the storage unit 121, the table search unit 114 identifies the fourth conversion table as the target conversion table in step S209. The control device 110 identifies the target conversion table, and the process ends.

When identifying the target conversion table in step S209, the control device 110 may display the search result screen 170 shown in FIG. 11. FIG. 11 shows an outline of the search result screen 170. The search result screen 170 is displayed when the display data generation unit 115 generates result screen data and transmits the result screen data to the display unit 141. The display unit 141 displays the search result screen 170 based on the result screen data.

The search result screen 170 shown in FIG. 11 displays a search result display field 171. The search result display field 171 displays contents of a search tag added to the target conversion table identified by the table search unit 114, or the like. The search result display field 171 displays a conversion table name display field 172, a priority order display field 173, a search item display field 174, a search value display field 175, a determination result display field 176, and a selection icon 177.

The conversion table name display field 172 displays a name of the identified conversion table 125. In the second embodiment, a name of the fourth conversion table is displayed. As shown in FIG. 11, the name of the fourth conversion table is "Table B".

The priority order display field 173 displays the priority order of the search items. The priority order display field 173 is displayed corresponding to the priority order of the search parameters shown in FIG. 9. The priority order display field 173 shown in FIG. 11 displays a priority order same as that of the search parameters shown in FIG. 9.

The search item display field 174 displays search items corresponding to a plurality of search parameters. The search item display field 174 is displayed corresponding to the types of the search parameters in the search parameter group shown in FIG. 9. The search item display field 174 of FIG. 11 displays the types of the search parameters shown in FIG. 9.

The search value display field 175 displays the parameters included in the search tag added to the identified target conversion table in association with the search items. The search value display field 175 displays the parameters compared with the plurality of search parameters. The search value display field 175 of FIG. 11 displays the parameters shown in FIG. 10A.

The determination result display field 176 displays a comparison result between the plurality of search parameters and the plurality of parameters included in the search tag. The determination result display field 176 of FIG. 11 shows a comparison result between the plurality of parameters shown in FIG. 9 and the parameters of the fourth conversion table shown in FIG. 10A. The determination result display field 176 shown in FIG. 11 indicates that all the parameters match those of the search parameter group.

The selection icon 177 receives an operation by the user. When the selection icon 177 is operated by the user, the control device 110 transmits a search result shown in FIG. 11 to the data processing unit 116. The control device 110 transmits the fourth conversion table, which is the identified target conversion table, to the data processing unit 116. When the selection icon 177 is operated by the user, the control device 110 determines the identified target conversion table. The data processing unit 116 converts the image data into the print data including the ink ejection amount data by using the received target conversion table.

In the second embodiment, the control device 110 searches the conversion table 125 corresponding to the plurality of search parameters in the storage unit 121. The control device 110 identifies the conversion table 125 including the parameters matching the plurality of search parameters in the storage unit 121 as the target conversion table. When the conversion table 125 including the parameters matching the plurality of search parameters is not stored in the storage unit 121, the control device 110 transmits the plurality of search parameters to the server 200. The server 200 extracts the conversion table 125 to which the search tag including the parameters matching the plurality of parameters is added. The server 200 transmits the extracted conversion table 125 to the control device 110. The control device 110 identifies the received conversion table 125 as the target conversion table. The control device 110 can identify the target conversion table from the storage unit 121 and the server storage unit 210.

The communication interface 151 coupled to the server 200 is provided, and when the table search unit 114 determines that no target conversion table is in the storage unit 121, the table search unit 114 transmits the plurality of search parameters to the server 200 via the communication interface 151 and acquires the target conversion table from the server 200 via the communication interface 151.

When the target conversion table is not stored in the storage unit 121, the control device 110 can acquire the target conversion table from the server 200.

In the above embodiment, the table search unit 114 identifies the conversion table 125 including the parameters matching all the search parameters as the target conversion table, but the present disclosure is not limited thereto. The table search unit 114 may identify the target conversion table based on the priority order. For example, the conversion table 125 including the parameter included in the search tag being the secondary color ink use amount upper limit value, which is a search item of a fourth priority order, may be identified as the target conversion table. The table search unit 114 may identify the target conversion table by weighting the search parameters based on the information indicating the priority order.

Third Embodiment

Figure 12:
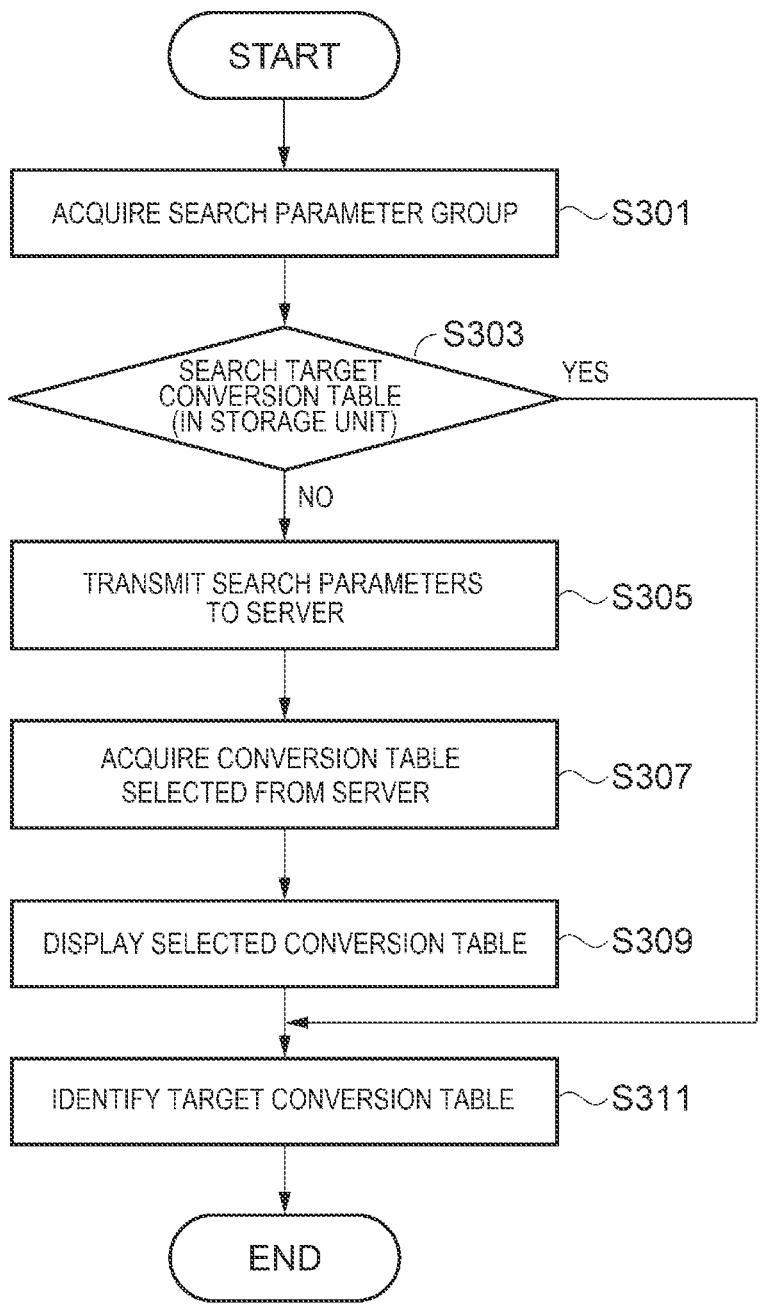
FIG. 12 is a flowchart for searching the target conversion table.

FIG. 12 is a flowchart for searching the target conversion table. FIG. 12 shows the flowchart according to a third embodiment. The control device 110 performs an operation of each step shown in FIG. 12 by the control unit 111 executing the printer driver. FIG. 12 shows a case in which the control device 110 searches the plurality of conversion tables 125 stored in the storage unit 121 and the plurality of conversion tables 125 stored in the server storage unit 210 of the server 200. FIGS. 13A, 13B, and 13C show contents of search tags added to the plurality of conversion tables 125 stored in the storage unit 121 or the server storage unit 210. The search tags are respectively added to the plurality of conversion tables 125. In FIGS. 13A, 13B, and 13C, parameters corresponding to search items are extracted from parameters included in the search tags and shown in the table format. In the third embodiment, a search parameter group used for searching is the same as the search parameter group shown in FIG. 9 according to the second embodiment. The third embodiment shows a case in which the server storage unit 210 does not include the conversion table 125 having the parameters matching that of the search parameter group.

In step S301 of FIG. 12, the control device 110 acquires a search parameter group. The control device 110 causes the display unit 141 to display the input screen 160. The user inputs setting values for a plurality of setting items and a priority order of the plurality of setting items on the input screen 160. The data acquisition unit 113 acquires the search parameter group shown in FIG. 9 based on the plurality of setting values input by the user and the priority order of the plurality of setting items.

After the search parameter group is acquired, the control device 110 searches the target conversion table in step S303. In step S303, the control device 110 searches the plurality of conversion tables 125 stored in the storage unit 121 for the target conversion table. The table search unit 114 searches the plurality of conversion tables 125 stored in the storage unit 121 for the target conversion table based on the search parameter group acquired by the data acquisition unit 113.

In step S303, the table search unit 114 searches the plurality of conversion tables 125 stored in the storage unit 121 by using the search parameter group shown in FIG. 9. The table search unit 114 searches the conversion table 125 including the plurality of parameters matching the plurality of search parameters. The table search unit 114 searches whether the fourth conversion table shown in the second embodiment is stored in the storage unit 121. When the table search unit 114 determines that the fourth conversion table is stored in the storage unit 121, the control device 110 proceeds to step S311. When the table search unit 114 determines that the fourth conversion table is not stored in the storage unit 121, the control device 110 proceeds to step S305.

When the table search unit 114 determines that the fourth conversion table is not stored in the storage unit 121, the control device 110 transmits the search parameters to the server 200 in step S305. The table search unit 114 transmits the search parameters to the server 200 via the communication interface 151.

When the search parameters are received via the server communication interface 220, the server 200 searches the target conversion table. The server 200 searches the conversion table 125 stored in the server storage unit 210 by using the search parameters.

In the third embodiment, the server storage unit 210 stores the plurality of conversion tables 125 including a seventh conversion table, an eighth conversion table, and a ninth conversion table. The server storage unit 210 does not store the fourth conversion table shown in the second embodiment.

The seventh conversion table has the search tag shown in FIG. 13A. The search tag shown in FIG. 13A indicates "CLcMLmYKOrVi" as the parameter related to the ink composition. The search tag shown in FIG. 13A indicates "190%" as the parameter related to the total ink use amount upper limit value. The search tag shown in FIG. 13A indicates "100%" as the parameter related to the primary color ink use amount upper limit value. The search tag shown in FIG. 13A indicates "110%" as the parameter related to the secondary color ink use amount upper limit value. As compared with the search parameter group shown in FIG. 9, the ink composition and the primary color ink use amount upper limit value in the search tag match the ink composition and the primary color ink use amount upper limit value of the search parameters, respectively. The total ink use amount upper limit value and the secondary color ink use amount upper limit value in the search tag do not match the total ink use amount upper limit value and the secondary color ink use amount upper limit value of the search parameters.

The eighth conversion table has the search tag shown in FIG. 13B. The search tag shown in FIG. 13B indicates "CLcMLmYKOrVi" as the parameter related to the ink composition. The search tag shown in FIG. 13B indicates "200%" as the parameter related to the total ink use amount upper limit value. The search tag shown in FIG. 13B indicates "90%" as the parameter related to the primary color ink use amount upper limit value. The search tag shown in FIG. 13B indicates "110%" as the parameter related to the secondary color ink use amount upper limit value. As compared with the search parameters shown in FIG. 9, the ink composition and the total ink use amount upper limit value in the search tag match the ink composition and the total ink use amount upper limit value of the search parameters, respectively. The primary color ink use amount upper limit value and the secondary color ink use amount upper limit value in the search tag do not match the primary color ink use amount upper limit value and the secondary color ink use amount upper limit value of the search parameters.

The ninth conversion table has the search tag shown in FIG. 13C. The search tag shown in FIG. 13C indicates "CLcMLmYKOrVi" as the parameter related to the ink composition. The search tag shown in FIG. 13C indicates "150%" as the parameter related to the total ink use amount upper limit value. The search tag shown in FIG. 13C indicates "90%" as the parameter related to the primary color ink use amount upper limit value. The search tag shown in FIG. 13C indicates "100%" as the parameter related to the secondary color ink use amount upper limit value. As compared with the search parameters shown in FIG. 9, the ink composition in the search tag matches the ink composition of the search parameters. The total ink use amount upper limit value, the primary color ink use amount upper limit value, and the secondary color ink use amount upper limit value in the search tag do not match the total ink use amount upper limit value, the primary color ink use amount upper limit value, and the secondary color ink use amount upper limit value of the search parameters.

The seventh conversion table, the eighth conversion table, and the ninth conversion table each have the search tag including the same parameter as a search parameter of a first priority order among the plurality of search parameters shown in FIG. 9. The seventh conversion table, the eighth conversion table, and the ninth conversion table each have the search tag including the parameters approximate to the plurality of search parameters shown in FIG. 9.

The server 200 selects the seventh conversion table and the eighth conversion table from the plurality of conversion tables 125 stored in the server storage unit 210. The server 200 selects the seventh conversion table and the eighth conversion table based on the plurality of search parameters including the priority order. The selected seventh conversion table and eighth conversion table correspond to an example of a candidate image conversion table. In the ninth conversion table, a parameter of a second priority order and a parameter of a third priority order are not approximate to the corresponding search parameters as compared with the parameters of the seventh conversion table and the eighth conversion table. The server 200 does not select the ninth conversion table. The server 200 transmits the selected seventh conversion table and eighth conversion table to the control device 110 via the server communication interface 220. The data acquisition unit 113 acquires the seventh conversion table and the eighth conversion table via the communication interface 151. The data acquisition unit 113 transmits the acquired seventh conversion table and eighth conversion table to the table search unit 114.

The control device 110 receives the seventh conversion table and the eighth conversion table selected from the server 200. In step S307, the data acquisition unit 113 acquires the seventh conversion table and the eighth conversion table from the server 200 via the communication interface 151. The data acquisition unit 113 transmits the acquired seventh conversion table and eighth conversion table to the display data generation unit 115. The display data generation unit 115 generates selection screen data based on the received seventh conversion table and eighth conversion table.

The seventh conversion table and the eighth conversion table may be selected not by the server 200 but by the table search unit 114. The server 200 extracts the seventh conversion table, the eighth conversion table, and the ninth conversion table, and transmits the seventh conversion table, the eighth conversion table, and the ninth conversion table to the control device 110. The data acquisition unit 113 of the control device 110 acquires the transmitted seventh conversion table, eighth conversion table, and ninth conversion table, and transmits the seventh conversion table, the eighth conversion table, and the ninth conversion table to the table search unit 114. The table search unit 114 selects the seventh conversion table and the eighth conversion table from the transmitted seventh conversion table, eighth conversion table, and ninth conversion table. The table search unit 114 compares the search parameter group with the parameters included in the search tag of each conversion table 125, and selects the conversion tables 125 approximate to the target conversion table.

In step S309, the control device 110 displays the selection screen 180 based on the selection screen data. FIG. 14 shows an outline of the selection screen 180. The display data generation unit 115 causes the display unit 141 to display the selection screen 180 by transmitting the selection screen data to the display unit 141.

The selection screen 180 shown in FIG. 14 displays a first display field 181A and a second display field 181B. The first display field 181A displays contents of a search tag added to one conversion table 125 selected by the server 200, or the like. The first display field 181A shown in FIG. 14 displays contents of the search tag added to the eighth conversion table. The second display field 181B displays contents of the search tag added to one conversion table 125 selected by the server 200, or the like. The second display field 181B shown in FIG. 14 displays contents of the search tag added to the seventh conversion table. FIG. 14 displays two display fields of the first display field 181A and the second display field 181B, but the present disclosure is not limited thereto. The selection screen 180 may display one display field or three or more display fields. The contents displayed in the first display field 181A and the contents displayed in the second display field 181B are the same.

The first display field 181A displays a first conversion table name display field 182A, a first priority order display field 183A, a first search item display field 184A, a first search value display field 185A, a first determination result display field 186A, and a first selection icon 187A. The second display field 181B displays a second conversion table name display field 182B, a second priority order display field 183B, a second search item display field 184B, a second search value display field 185B, a second determination result display field 186B, and a second selection icon 187B.

The first conversion table name display field 182A and the second conversion table name display field 182B display the names of the selected conversion tables 125. In FIG. 14, the first conversion table name display field 182A displays "Table C", which is a name of the eighth conversion table. The second conversion table name display field 182B displays "Table A", which is a name of the seventh conversion table.

The first priority order display field 183A and the second priority order display field 183B display the priority orders of the search items. The first priority order display field 183A and the second priority order display field 183B are displayed corresponding to the priority order of the search parameter group shown in FIG. 9. The first priority order display field 183A and the second priority order display field 183B shown in FIG. 14 display the same priority order as the search parameters shown in FIG. 9.

The first search item display field 184A and the second search item display field 184B display search items corresponding to a plurality of search parameters. The first search item display field 184A and the second search item display field 184B are displayed corresponding to the types of the search parameters in the search parameter group shown in FIG. 9. The first search item display field 184A and the second search item display field 184B shown in FIG. 14 display the types of the search parameters shown in FIG. 9.

The first search value display field 185A and the second search value display field 185B display the parameters included in the search tags added to the selected conversion tables 125 in association with the search items. The first search value display field 185A and the second search value display field 185B display the parameters compared with the plurality of search parameters. The first search value display field 185A shown in FIG. 14 displays the parameters shown in FIG. 13B. The second search value display field 185B shown in FIG. 14 displays the parameters shown in FIG. 13A.

The first determination result display field 186A and the second determination result display field 186B each display a comparison result between the search parameters and the parameters included in the search tag. The first determination result display field 186A shown in FIG. 14 shows comparison results between the parameter group shown in FIG. 9 and the parameters of the eighth conversion table shown in FIG. 13B. The second determination result display field 186B shown in FIG. 14 shows comparison results between the parameter group shown in FIG. 9 and the parameters of the seventh conversion table shown in FIG. 13A. When the comparison results match to each other, "match" is displayed. When the comparison results are different, the difference is displayed by a numerical value.

The first selection icon 187A and the second selection icon 187B receive an operation by the user. When the first selection icon 187A is operated by the user, the control device 110 transmits the conversion table 125 corresponding to the contents displayed in the first display field 181A to the data processing unit 116. The control device 110 transmits the seventh conversion table as the identified target conversion table to the data processing unit 116. When the second selection icon 187B is operated by the user, the control device 110 transmits the conversion table 125 corresponding to the contents displayed in the second display field 181B to the data processing unit 116. The control device 110 transmits the eighth conversion table as the identified target conversion table to the data processing unit 116. When the first selection icon 187A or the second selection icon 187B is operated by the user, the control device 110 identifies the target conversion table in step S311. The data processing unit 116 converts the image data into the ink ejection amount data by using the received target conversion table.

In the third embodiment, the control device 110 searches the conversion table 125 including the parameters corresponding to the plurality of search parameters in the storage unit 121. The control device 110 identifies the conversion table 125 including the parameters matching the plurality of search parameters in the storage unit 121 as the target conversion table. When the conversion table 125 including the parameters matching the plurality of search parameters is not stored in the storage unit 121, the control device 110 transmits the plurality of search parameters to the server 200. The server 200 selects the conversion table 125 including the parameters approximate to the plurality of parameters. The server 200 transmits the selected conversion table 125 to the control device 110. The control device 110 displays the parameters indicating the selected conversion table 125 and the comparison results between the search parameters and the parameters on the display unit 141. The user identifies the target conversion table by performing a predetermined operation on the displayed selection screen 180. The user can identify the target conversion table even when the conversion table 125 including the parameters matching the search parameters is not stored.

In the third embodiment, the user identifies the target conversion table by performing the predetermined operation on the displayed selection screen 180, but the present disclosure is not limited thereto. The control device 110 may identify the target conversion table based on a degree of approximation between the search parameters and the parameters included in the conversion table 125 and the priority order of the search items. The control device 110 may display information indicating the identified target conversion table on the search result screen 170 shown in FIG. 11.

The communication interface 151 coupled to the server 200 is provided, and when the table search unit 114 determines that no target conversion table is in the storage unit 121, the table search unit 114 transmits the plurality of search parameters to the server 200 via the communication interface 151 and acquires the selected target conversion table 125 from the server 200 via the communication interface 151.

When the target conversion table is not stored in the storage unit 121, the control device 110 can acquire the conversion table 125 as a candidate of the target conversion table from the server 200.

Fourth Embodiment

Figures 15, 16A:
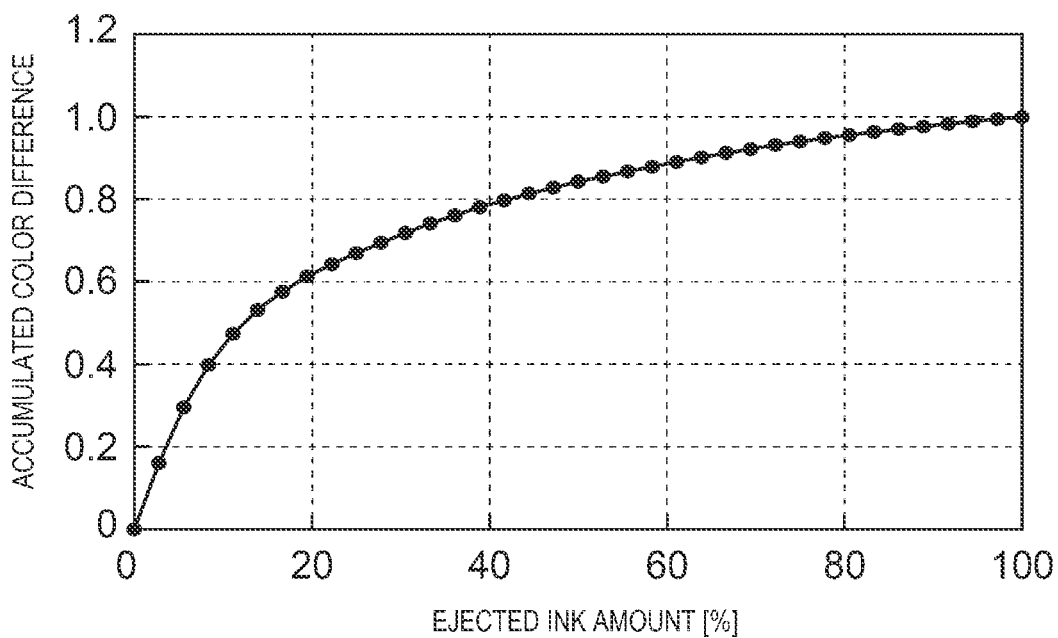
FIG. 15 is a diagram showing a plurality of search parameters included in a search parameter group in the table format.
FIG. 16A is a diagram showing accumulated color differences with respect to ejected ink amounts.

In a fourth embodiment, the control device 110 identifies the target conversion table by using a search parameter group shown in FIG. 15. FIG. 15 shows the search parameter group in the table format. FIG. 15 shows a priority order of a plurality of search parameters. FIG. 15 includes a degree of closeness to a color change table as the type of the search parameter. In the fourth embodiment, similarly to the third embodiment, the target conversion table is identified by the flowchart shown in FIG. 12. The fourth embodiment shows a case in which the storage unit 121 and the server storage unit 210 do not include the conversion table 125 matching the plurality of search parameters.

FIG. 15 shows the plurality of search parameters. In FIG. 15, the ink composition is set as the first priority order, and the total ink use amount upper limit value, the primary color ink use amount upper limit value, the secondary color ink use amount upper limit value, and the degree of closeness to the color change table are set as the second priority order. The degree of closeness to the color change table indicates a search color change table as the search parameter.

Figure 16B:
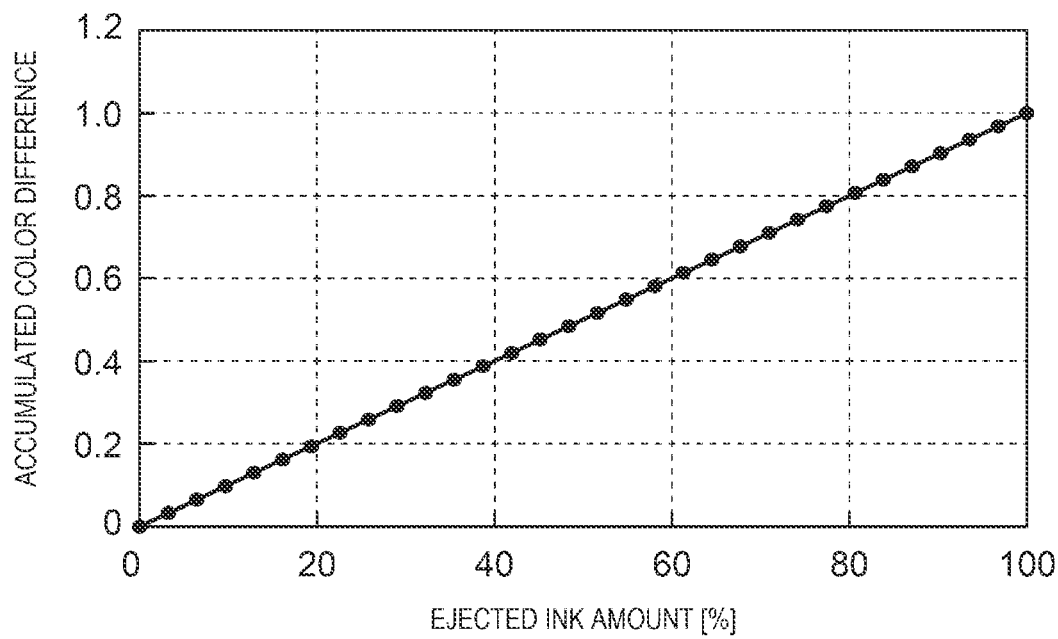
FIG. 16B is a diagram in which the ejected ink amounts and the accumulated color differences are linearized.
Figure 16C:
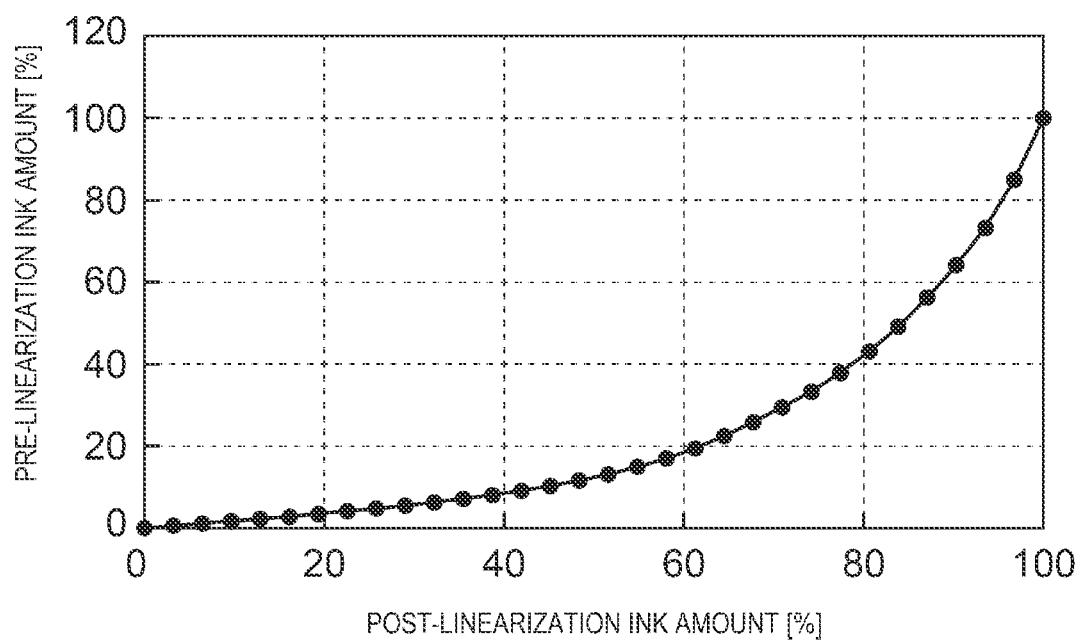
FIG. 16C is a diagram showing a relationship between the ink ejection amounts before and after being linearized.

FIGS. 16A, 16B, and 16C show a method of calculating the color change table. FIG. 16A shows a relationship between an ejected ink amount and an accumulated color difference. The user of the printer 100 uses the printer 100 to print the ink amount adjustment test chart on the desired print medium M. The ink amount adjustment test chart is formed by a plurality of patch images printed by changing the ejected ink amount from 0% to 100% at predetermined intervals. The user measures color values of the plurality of patch images. The user calculates the accumulated color difference with respect to the ejected ink amount based on the measured color value data. The accumulated color difference shown in FIG. 16A is calculated assuming that the accumulated color difference when the ejected ink amount is 100% is 1.

As shown in FIG. 16A, a graph of the accumulated color difference with respect to the ejected ink amount is nonlinear. FIG. 16B is a graph showing a case in which the accumulated color difference linearly changes with respect to the ejected ink amount. In FIG. 16B, when the ejected ink amount changes from 0 to 100%, the accumulated color difference changes substantially linearly. In FIG. 16C, the ejected ink amount with which the accumulated color difference linearly changes is calculated. FIG. 16C shows a relationship between a post-linearization ink amount and a pre-linearization ink amount. The pre-linearization ink amount indicates a change in the ejected ink amount with respect to the accumulated color difference shown in FIG. 16A. The post-linearization ink amount indicates the ejected ink amount with which the accumulated color difference linearly changes. The graph shown in FIG. 16C shows the search color change table included in the search parameter group shown in FIG. 15. The search parameters related to the color change table shown in FIG. 15 include graph data shown in FIG. 16C as the search color change table.

FIGS. 17A, 17B, and 17C show contents of search tags added to the plurality of conversion tables 125 stored in the server storage unit 210. The search tags are respectively added to the plurality of conversion tables 125. In FIGS. 17A, 17B, and 17C, parameters corresponding to search items are extracted from parameters included in the search tags and shown in the table format. FIGS. 17A, 17B, and 17C each include the color change table as the type of the parameter. The color change tables included in FIGS. 17A, 17B, and 17C are provided in advance by the manufacturer of the printer 100 or an administrator of the printer 100. The color change table included in the parameters is calculated based on ink adjustment test data printed on the print medium M using other parameters as setting conditions. The color change table included in the parameters is graph data similar to FIG. 16C.

In the fourth embodiment, the server storage unit 210 stores the plurality of conversion tables 125 including a tenth conversion table, an eleventh conversion table, and a twelfth conversion table.

The tenth conversion table has the search tag shown in FIG. 17A. The search tag shown in FIG. 17A indicates "CLcMLmYKOrVi" as the parameter related to the ink composition. The search tag shown in FIG. 17A indicates "190%" as the parameter related to the total ink use amount upper limit value. The search tag shown in FIG. 17A indicates "100%" as the parameter related to the primary color ink use amount upper limit value. The search tag shown in FIG. 17A indicates "110%" as the parameter related to the secondary color ink use amount upper limit value. The search tag shown in FIG. 17A indicates "color change table A" as a parameter related to the color change table. As compared with the search parameters shown in FIG. 15, the ink composition and the primary color ink use amount upper limit value of the search tag match the ink composition and the primary color ink use amount upper limit value of the search parameters, respectively. The total ink use amount upper limit value and the secondary color ink use amount upper limit value of the search tag do not match the total ink use amount upper limit value and the secondary color ink use amount upper limit value of the search parameters.

The eleventh conversion table has the search tag shown in FIG. 17B. The search tag shown in FIG. 17B indicates "CLcMLmYKOrVi" as the parameter related to the ink composition. The search tag shown in FIG. 17B indicates "200%" as the parameter related to the total ink use amount upper limit value. The search tag shown in FIG. 17B indicates "90%" as the parameter related to the primary color ink use amount upper limit value. The search tag shown in FIG. 17B indicates "110%" as the parameter related to the secondary color ink use amount upper limit value. The search tag shown in FIG. 17B indicates "color change table B" as the parameter related to the color change table. As compared with the search parameters shown in FIG. 15, the ink composition and the total ink use amount upper limit value of the search tag match the ink composition and the total ink use amount upper limit value of the search parameters, respectively. The primary color ink use amount upper limit value and the secondary color ink use amount upper limit value of the search tag do not match the primary color ink use amount upper limit value and the secondary color ink use amount upper limit value of the search parameters.

The twelfth conversion table has the search tag shown in FIG. 17C. The search tag shown in FIG. 17C indicates "CLcMLmYKOrVi" as the parameter related to the ink composition. The search tag shown in FIG. 17C indicates "150%" as the parameter related to the total ink use amount upper limit value. The search tag shown in FIG. 17C indicates "90%" as the parameter related to the primary color ink use amount upper limit value. The search tag shown in FIG. 17C indicates "100%" as the parameter related to the secondary color ink use amount upper limit value. The search tag shown in FIG. 17C indicates "color change table C" as the parameter related to the color change table. As compared with the search parameters shown in FIG. 15, the ink composition of the search tag matches the ink composition of the search parameters. The total ink use amount upper limit value, the primary color ink use amount upper limit value, and the secondary color ink use amount upper limit value of the search tag do not match the total ink use amount upper limit value, the primary color ink use amount upper limit value, and the secondary color ink use amount upper limit value of the search parameters.

The tenth conversion table, the eleventh conversion table, and the twelfth conversion table each have the search tag including the same parameter as the search parameter of the first priority order among the search parameter group shown in FIG. 15. The tenth conversion table, the eleventh conversion table, and the twelfth conversion table each have the search tag including the parameters approximate to those of the search parameter group shown in FIG. 15.

In the fourth embodiment, the control device 110 identifies the target conversion table according to the flowchart shown in FIG. 12. Since the storage unit 121 does not store the conversion table 125 having the search tag including the parameters matching the search parameter group shown in FIG. 15, the table search unit 114 transmits the search parameters shown in FIG. 15 to the server 200 in step S305. The server 200 receives the search parameters. The server 200 searches the conversion table 125 stored in the server storage unit 210 in step S307. The server 200 selects the conversion table 125 including the parameters approximate to the search parameters from the conversion tables 125 stored in the server storage unit 210. The server 200 transmits the selected conversion table 125 to the control device 110. The table search unit 114 causes the server 200 to search the conversion table 125 approximate to the search parameter group by transmitting the search parameter group to the server 200. In the fourth embodiment, the server 200 transmits the tenth conversion table, the eleventh conversion table, and the twelfth conversion table to the control device 110.

The control device 110 receives the tenth conversion table, the eleventh conversion table, and the twelfth conversion table as the conversion tables 125 selected from the server 200. In step S307, the data acquisition unit 113 acquires the tenth conversion table, the eleventh conversion table, and the twelfth conversion table from the server 200 via the communication interface 151. The data acquisition unit 113 transmits the received tenth conversion table, eleventh conversion table, and twelfth conversion table to the table search unit 114. The table search unit 114 calculates the degree of closeness to the color change table. The table search unit 114 calculates the degree of closeness to the color change table based on the search color change table included in the search parameters and the color change table which is the parameter included in the search tag.

FIG. 18 shows a search color change table included in the search parameters. FIG. 18 is a graph showing a relationship between the post-linearization ink amount and the pre-linearization ink amount. The graph shown in FIG. 18 is obtained in steps shown in FIGS. 16A to 16C. The search parameters related to the color change table include the color change table that is the graph shown in FIG. 18.

Figure 19:
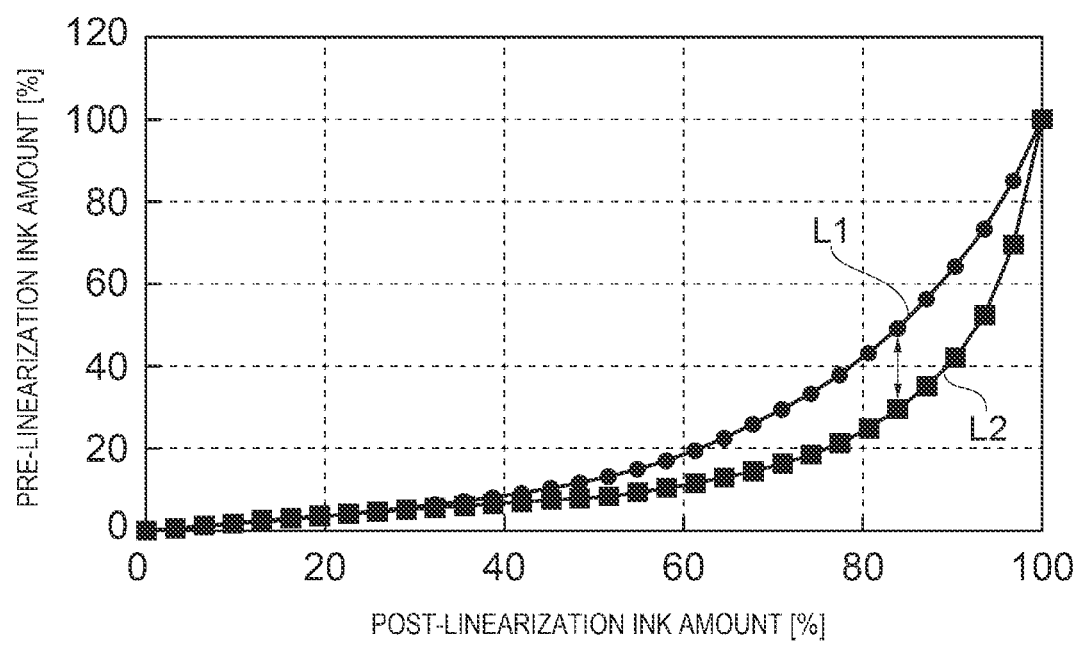
FIG. 19 is a diagram illustrating a method for calculating a degree of closeness of a color change table.

FIG. 19 is a diagram illustrating a method for calculating the degree of closeness. FIG. 19 shows a first line L1 indicating the search color change table shown in FIG. 18 and a second line L2 indicating the color change table included in the search tag. The second line L2 indicating the color change table included in the search tag shown in FIG. 19 indicates, as an example, the color change table B included in the search tag shown in FIG. 17B. Arrows shown in FIG. 19 indicate a difference between the search color change table and the color change table B.

The table search unit 114 divides the post-linearization ink amount shown in FIG. 19 into 32 grids. The table search unit 114 calculates an absolute value of a difference between the search color change table and the color change table B for each grid. The table search unit 114 adds up the calculated absolute values of the differences for all grids. In a case of FIG. 19, a total value of the differences is, for example, 300.88. The table search unit 114 divides the calculated total value of the differences by 32 which is the number of the grids. A value obtained by dividing the total value of the differences by the number of the grids is 9.4. 9.4 denotes the degree of closeness between the search color change table and the color change table B. The degree of closeness closer to 0 indicates that the search color change table and the compared color change table are closer to each other.

Similarly to the degree of closeness between the color change table B and the search color change table, the table search unit 114 calculates a degree of closeness between the color change table A and the search color change table, and a degree of closeness between the color change table C and the search color change table. The degree of closeness between the color change table A and the search color change table is 11.3. The degree of closeness between the color change table C and the search color change table is 14.8.

When the table search unit 114 acquires the selected conversion table 125, the table search unit 114 calculates the degree of closeness between the search color change table and the color change table included in the search tag, among the plurality of search parameters.

The control device 110 can grasp the degree of approximation between the search parameters and the selected conversion table 125 by a numerical value.

After calculating each degree of closeness, the control device 110 displays the contents of the search tag added to the selected conversion table 125 in step S309. FIG. 20 shows the selection screen 180 displayed in the fourth embodiment. The selection screen 180 shown in FIG. 20 has the same configuration as the selection screen 180 shown in FIG. 14. A display content displayed in each display field of the selection screen 180 shown in FIG. 20 is different from a display content displayed in each display field of the selection screen 180 shown in FIG. 14.

The display data generation unit 115 generates selection screen data for displaying the selection screen 180 shown in FIG. 20 on the display unit 141. The selection screen data generated by the display data generation unit 115 includes contents of the search tag added to the selected conversion table 125 and the calculated degree of closeness. The display data generation unit 115 transmits the generated selection screen data to the display unit 141. The display unit 141 displays the selection screen 180 shown in FIG. 20 based on the received selection screen data.

The control device 110 includes the display data generation unit 115 that generates the selection screen data for displaying the contents of the search tag indicating the selected conversion table 125, and the degree of closeness between the search color change table and the color change table included in the search tag.

The control device 110 can display the calculated degree of closeness. The user can easily identify the target conversion table by checking the degree of closeness.

The first display field 181A shown in FIG. 20 displays contents of the search tag added to the tenth conversion table. The second display field 181B shown in FIG. 20 displays contents of the search tag added to the eleventh conversion table. FIG. 20 does not show contents of the search tag added to the twelfth conversion table. The parameters included in the search tag added to the twelfth conversion table shown in FIG. 17C are not approximate to the search parameters as compared with the parameters shown in FIGS. 17A and 17B. The degree of closeness between the color change table C and the search color change table has a larger value than the other degrees of closeness. From these points, the table search unit 114 does not select the twelfth conversion table. The table search unit 114 does not transmit the contents of the search tag added to the twelfth conversion table to the display data generation unit 115. The display data generation unit 115 does not display the contents of the search tag added to the twelfth conversion table on the selection screen 180 shown in FIG. 20.

In FIG. 20, the first conversion table name display field 182A displays "Table D", which is a name of the tenth conversion table. In FIG. 20, the second conversion table name display field 182B displays "Table E", which is a name of the eleventh conversion table.

The first priority order display field 183A and the second priority order display field 183B shown in FIG. 20 are displayed corresponding to the priority order of the search parameters shown in FIG. 15. The first priority order display field 183A and the second priority order display field 183B shown in FIG. 20 display the same priority order as the search parameter group shown in FIG. 15.

The first search item display field 184A and the second search item display field 184B shown in FIG. 20 are displayed corresponding to the types of the search parameters in the search parameter group shown in FIG. 15. The first search item display field 184A and the second search item display field 184B shown in FIG. 20 display the degree of closeness to the color change table as the type of the parameter. When the color change table is included in the search parameter group shown in FIG. 15, the degree of closeness to the color change table is displayed. The first search item display field 184A and the second search item display field 184B shown in FIG. 20 display the types of the search parameters shown in FIG. 15.

The first search value display field 185A and the second search value display field 185B shown in FIG. 20 display the parameters compared with the search parameter group. The first search value display field 185A shown in FIG. 20 displays the parameters shown in FIG. 17A. The second search value display field 185B shown in FIG. 20 displays the parameters shown in FIG. 17B. The display field corresponding to the degree of closeness to the color change table displays the calculated degree of closeness. The first search value display field 185A shown in FIG. 20 displays the degree of closeness between the search color change table and the color change table A. The second search value display field 185B shown in FIG. 20 displays the degree of closeness between the search color change table and the color change table B.

The first determination result display field 186A shown in FIG. 20 shows comparison results between the search parameter group shown in FIG. 15 and the parameters of the tenth conversion table shown in FIG. 17A. The second determination result display field 186B shown in FIG. 20 shows comparison results between the search parameter group shown in FIG. 15 and the parameters of the eleventh conversion table shown in FIG. 17B.

When the first selection icon 187A is operated by the user, the control device 110 transmits the conversion table 125 corresponding to the contents displayed in the first display field 181A to the data processing unit 116. The control device 110 transmits the tenth conversion table as the identified target conversion table to the data processing unit 116. When the second selection icon 187B is operated by the user, the control device 110 transmits the conversion table 125 corresponding to the contents displayed in the second display field 181B to the data processing unit 116. The control device 110 transmits the eleventh conversion table as the identified target conversion table to the data processing unit 116. When the first selection icon 187A or the second selection icon 187B is operated by the user, the control device 110 identifies the target conversion table in step S311. The data processing unit 116 converts the image data into the ink ejection amount data by using the received target conversion table.

In the fourth embodiment, the user identifies the target conversion table by performing the predetermined operation on the displayed selection screen 180, but the present disclosure is not limited thereto. The control device 110 may identify the target conversion table based on a degree of approximation between the search parameters and the parameters included in the conversion table 125 and the priority order of the search items. The control device 110 may display information indicating the identified target conversion table on the search result screen 170 shown in FIG. 11.

What is claimed is:

1. An image processing device coupled to a printing device that performs printing on a medium by ejecting ink having a plurality of colors, and configured to convert image data into ink amount data, the image processing device comprising:
an input unit configured to input a search condition;
an acquisition unit configured to acquire a plurality of search values based on the search condition input by the input unit;
a table storage unit storing a plurality of image conversion tables for converting the image data into the ink amount data; and
a search unit configured to search the plurality of image conversion tables for a target image conversion table based on the plurality of search values acquired by the acquisition unit,
the plurality of search values including priority order information indicating a priority order of the plurality of search values, and
the search unit searching the target image conversion table by using the priority order information.

2. An image processing device coupled to a printing device that performs printing on a medium by ejecting ink having a plurality of colors, and configured to convert image data into ink amount data, the image processing device comprising:
an input unit configured to input a search condition;
an acquisition unit configured to acquire a plurality of search values based on the search condition input by the input unit;
a table storage unit storing a plurality of image conversion tables for converting the image data into the ink amount data; and
a search unit configured to search the plurality of image conversion tables for a target image conversion table based on the plurality of search values acquired by the acquisition unit,
the plurality of search values including a secondary color ink use amount limit value which is a maximum setting value of a use amount of ink of two colors among the ink having the plurality of colors.

3. An image processing device coupled to a printing device that performs printing on a medium by ejecting ink having a plurality of colors, and configured to convert image data into ink amount data, the image processing device comprising:
- an input unit configured to input a search condition;
- an acquisition unit configured to acquire a plurality of search values based on the search condition input by the input unit;
- a table storage unit storing a plurality of image conversion tables for converting the image data into the ink amount data;
- a search unit configured to search the plurality of image conversion tables for a target image conversion table based on the plurality of search values acquired by the acquisition unit; and
- a communication unit coupled to an external device, wherein
- when the search unit determines that the target image conversion table is not in the table storage unit, the search unit transmits the plurality of search values to the external device via the communication unit, and acquires the target image conversion table or a candidate image conversion table from the external device via the communication unit.

4. The image processing device according to claim 3, wherein
- the image conversion table has a tag including a plurality pieces of additional data respectively corresponding to the plurality of search values, and
- the search unit searches the target image conversion table by comparing the plurality of search values with the plurality pieces of additional data.

5. The image processing device according to claim 3, wherein
- when the candidate image conversion table is acquired, the search unit calculates a degree of closeness between one of the plurality of search values and the additional data.

6. The image processing device according to claim 5, further comprising:
- a display control unit configured to generate display data for displaying information indicating the candidate image conversion table and the degree of closeness.

7. An image processing method of an image processing device coupled to a printing device that performs printing by ejecting ink having a plurality of colors on a medium, the image processing method comprising:
- inputting a search condition;
- acquiring a plurality of search values based on the input search condition; and
- searching a plurality of image conversion tables for a target image conversion table based on the plurality of search values,
- the plurality of search values including priority order information indicating a priority order of the plurality of search values, and
- the searching of the image conversion tables including searching the target image conversion table by using the priority order information.

8. A non-transitory computer-readable storage medium storing an image processing program executed by a processor of an image processing device coupled to a printing device that performs printing by ejecting ink having a plurality of colors on a medium, the image processing program causing the processor to execute:
- inputting a search condition;
- acquiring a plurality of search values based on the input search condition; and
- searching a plurality of image conversion tables for a target image conversion table based on the plurality of search values,
- the plurality of search values including priority order information indicating a priority order of the plurality of search values, and
- the searching of the image conversion tables including searching the target image conversion table by using the priority order information.

* * * * *